United States Patent [19]
Carbonell et al.

[11] Patent Number: 6,163,785
[45] Date of Patent: *Dec. 19, 2000

[54] INTEGRATED AUTHORING AND TRANSLATION SYSTEM

[75] Inventors: Jaime G. Carbonell, Pittsburgh, Pa.; Sharlene L. Gallup, Morton, Ill.; Timothy J. Harris, Pekin, Ill.; James W. Higdon, Lacon, Ill.; Dennis A. Hill, East Peoria, Ill.; David C. Hudson, Edelstein, Ill.; David Nasjleti, Morton, Ill.; Mervin L. Rennich, Dunlap, Ill.; Peggy M. Andersen, Pittsburgh, Pa.; Michael M. Bauer, Pittsburgh, Pa.; Roy F. Busdiecker, III, Pittsburgh, Pa.; Philip J. Hayes, Pittsburgh, Pa.; Alison K. Huettner, Pittsburgh, Pa.; Bruce M. McLaren, Pittsburgh, Pa.; Irene Nirenburg, Pittsburgh, Pa.; Eric H. Riebling, Pittsburgh, Pa.; Linda M. Schmandt, Pittsburgh, Pa.; John F. Sweet, Pittsburgh, Pa.; Kathryn L. Baker, Pittsburgh, Pa.; Nicholas D. Brownlow, Pittsburgh, Pa.; Alexander M. Franz, Pittsburgh, Pa.; Susan E. Holm, Pittsburgh, Pa.; John Robert Russell Leavitt, Pittsburgh, Pa.; Deryle W. Lonsdale, Bridgeville, Pa.; Teruko Mitamura; Eric H. Nyberg, 3rd, both of Pittsburgh, Pa.

[73] Assignee: Caterpillar Inc., Peoria, Ill.

[ * ] Notice: This patent is subject to a terminal disclaimer.

[21] Appl. No.: 09/309,802

[22] Filed: May 11, 1999

Related U.S. Application Data

[63] Continuation of application No. 08/632,237, Apr. 15, 1996, which is a continuation of application No. 08/363,309, Dec. 22, 1994, Pat. No. 5,677,835, which is a continuation of application No. 07/941,180, Sep. 4, 1992, abandoned.

[51] Int. Cl.[7] ................................................ G06F 17/28

[52] U.S. Cl. ................ 707/530; 707/500; 707/531; 707/536; 704/2; 704/4; 704/8; 704/9; 704/10

[58] Field of Search ................. 704/1, 2, 4, 7, 704/8, 9, 10; 707/500, 530, 531, 536

[56] References Cited

U.S. PATENT DOCUMENTS

| 4,661,924 | 4/1987 | Okamoto et al. | 704/8 |
|---|---|---|---|
| 4,771,401 | 9/1988 | Kaufman et al. | 707/533 |
| 4,821,230 | 4/1989 | Kumano et al. | 704/6 |
| 4,829,423 | 5/1989 | Tennant et al. | 704/8 |
| 4,954,984 | 9/1990 | Kaijima et al. | 704/5 |

(List continued on next page.)

FOREIGN PATENT DOCUMENTS

| 0 387 226 | 9/1990 | European Pat. Off. . | |
|---|---|---|---|
| 0 469 884 | 2/1992 | European Pat. Off. . | |
| WO 94/06086 | 3/1994 | WIPO | G06F 15/38 |

OTHER PUBLICATIONS

"Interactive Author–Assistance Tool," IBM Technical Disclosure Bulletin, vol. 28, No. 12, pp. 5284–5286, May 1986.

(List continued on next page.)

*Primary Examiner*—Emanuel Todd Voeltz
*Assistant Examiner*—John W. Hayes
*Attorney, Agent, or Firm*—James R. Yee; Kevin M. Kercher; Jeffrey L. Myers

[57] ABSTRACT

The present invention is a system of integrated, computer-based processes for monolingual information development. and multilingual translation. An interactive text editor enforces lexical and grammatical constraints on a natural language subset used by the authors to create their text, which they help disambiguate to ensure translatability. The resulting translatable source language text undergoes machine translation into any one of a set of target languages, without the translated text requiring any postediting.

42 Claims, 10 Drawing Sheets

U.S. PATENT DOCUMENTS

| | | | |
|---|---|---|---|
| 5,175,684 | 12/1992 | Chong | 704/3 |
| 5,225,981 | 7/1993 | Yokogawa | 704/2 |
| 5,243,519 | 9/1993 | Andrews et al. | 704/8 |
| 5,677,835 | 10/1997 | Carbonell et al. | 704/8 |
| 5,995,920 | 11/1999 | Carbonell et al. | 704/9 |

OTHER PUBLICATIONS

"Structured, Universal Natural–Language Generator for Sophisticated Target–Language Generation in Machine Translation Systems," IBM Technical Disclosure Bulletin, vol. 31, No. 5, pp. 407–408, Oct. 1988.

Patent Abstracts of Japan, vol. 15, No. 376 (P–1255), Sep. 24, 1991, & JP–A–03 148760, Jun. 25, 1991.

"KBMT–89 Project Report", Carnegie Mellon Center for Machine Translation, Feb. 1989.

Adriaens, "From Cogram to Alcogram: Toward a Controlled English Grammar Checker" Proc.of Coling–92, Nantes, pp.595–601, Aug. 23, 1992.

Carbonell et al, "Knowledge–Based Machine Translation, the CMU Approach", Machine Translation—Theoretical and Methodological Issues.

Carbonell, Steps toward Knowledge–Based Machine Translation, IEEE Trans on Pattern Analysis and Machine Intelligence, No. 4 pp.376–392.

Eric H. Nyberg, 3rd, "The Framekit User's Guide—Version 2.0", Carnegie Mellon Center for Machine Translation, Paper No. CMU–CMT–Memo.

Goodman, The KBMT Project: A Case Study in Knowledge–Based Machine Translation, Morgan Kaufmann Publishers, Inc. 1991.

Meyer, "Lexicographic Principles & Design for Knowledge– Based Machine Translation"—Paper No. CMU–CMT–90–118, Carnegie Mellon Center.

Mitamura, "An Efficient Interlingua Translation System for Multi–Lingual Document Production" Wash.D.C. Jul. 2–4, 1991.

Nirenburg, Acquisition of Very Large Knowledge Bases: Methodology, Tools and Applications, Carnegie Mellon, Paper No. CMU–CMT–88–108, Jun. 1988.

Nirunburg, "Machine Translation: A Knowledge Based Approach", Morgan Kaufmann Publishers, Inc. 1992.

Somers, "An Introduction to Machine Translation", Academic Press, Oct. 1991.

Teruko Mitamura, "The Hierarchial Organization of Predicate Frames for Interpretive Mapping in Natural Language Proc", #CMU–CMT–90–117.

Tomita et al, "The Universal Parser Architecture for Knowledge–Based Machine Translation", Carnegie Mellon Center for Mach. Trans.

Tomita, "Generation Kit and Transformation Kit—Version 3.2—User's Manual", Carnegie Mellon Center for Mach Translation –#CMU–CMT–88–Memo.

Tomita, "The Generalized LR Parser/Compiler Version 8.1:User's Guide" Carnegie Mellon Center for Mach Translation, Paper No. CMU–CMT–88–Memo.

IBM, "New for IBM: Russian Language Translator for the PC", Newsbytes, Dialog File 275:Computer DB™, Mar. 27, 1990.

Perez et al, "Language Translation Program", Library Software Review, vol. 10, Issue 3, 6 pages, May/Jun. 1991.

INTEGRATED AUTHORING AND TRANSLATION SYSTEM

This is a continuation application of application Ser. No. 08/632,237, filed Apr. 15, 1996, which is a continuation of Ser. No. 08/363,309, filed Dec. 22, 1994, (issued Oct. 14, 1997 as 5,677,835), which is a file wrapper continuation of application Ser. No. 07/941,180, filed Sep. 4, 1992 (now abandoned).

BACKGROUND OF THE INVENTION

1. Field of The Invention

The present invention relates generally to computer-based document creation and translation system and, more particularly, to a system for authoring and translating constrained-language text to a foreign language with no pre- or post-editing required.

2. Related Art

Every organization whose activities require the generation of vast quantities of information in a variety of documents is confronted with the need to ensure their full intelligibility. Ideally, such documents should be authored in simple, direct language featuring all necessary expressive attributes to optimize communication. This language should be consistent so that the organization is identified through its single, stable voice. This language should be unambiguous.

The pursuit of this kind of writing excellence has led to the implementation of various disciplines designed to bring the authoring process under control. Yet authors of varied capabilities and backgrounds cannot comfortably be made to fit a uniform skill standard. Writing guidelines, rules and standards are elusive—difficult to define and enforce. Efforts aimed at both standardizing and improving on the quality of writing tend to meet with mixed results. However achieved and however successful, these results push up documentation authoring costs.

Recent attempts at surrounding authors with the software environment that might enhance their productivity and the quality of their writing have only succeeded in providing spell checkers. The effectiveness of other writing software has so far been disappointingly weak.

When the need to deliver information calls for the crossing of linguistic frontiers, the challenges multiply. The organization that needs to clear a channel for its information flow finds itself to a great extent, if not totally, dependent on translation.

Translation of text from one language to another language has been done for hundreds of years. Prior to the advent of computers, such translation was done completely manually by experts, called translators, who were fluent in the language of the original text (source text) and in the language of the translated text (target text). Typically, it was preferable for the translator to have originally learned the target language as his/her native tongue and subsequently have learned the source language. Such an approach was felt to result in the most accurate and efficient translation.

Even the most expert translator must take a considerable amount of time to translate a page of text. For example, it is estimated that an expert translator translating technical text from English to Japanese can only translate approximately 300 words (approximately one page) per hour. It can thus be seen that the amount of time and effort required to translate a document, particularly a technical one, is extensive.

The requirements for translation in business and commerce has grown steadily in the last hundred years. This is due to several factors. One is the rapid increase in the text associated with conducting business internationally. Another is the large number of languages that such texts must be translated into in order for a company to engage in global commerce. A third is the rapid pace of commerce which has resulted in frequent revisions of text documents, which requires subsequent translation of new versions.

Many organizations have the responsibility for creating and distributing information in multiple languages. In the global marketplace, the manufacture must ensure that the manuals are widely available in the host languages of their target markets. Manual translation of documents into foreign languages is a costly, time-consuming, and inefficient process. Translations are usually inconsistent owing to the individual interpretation of the translators who are not necessarily well-versed in the application specific language used in the documentation. Because of these problems, fewer manuals than would be ideal are actually translated.

In the areas of research and development, the explosion of knowledge which has occurred in the last century has also geometrically increased the need for the translation of documents. No longer is there one predominant language for documents in a particular field of research and development. Typically, such research and development activities are taking place in several advanced industrialized countries, such as, for example, the United States, United Kingdom, France, Germany, and Japan. Many times there are additional languages containing important documents relating to the particular area of research and development. Advances in technology, particularly in electronics and computers, have further accelerated the production of text in all languages.

The ability to produce text is directly proportional to the capability of the technology that is used. When documents had to be hand-written, for example, an author could only produce a certain number of words per unit of time. This increased significantly, however, with the advent of mechanical devices, such as typewriters, mimeograph machines, and printing presses. The advent of electronic, computer, and optical technology increased the capability of the author even further. Today, an average author can produce significantly more text in a given unit of time than any author could produce using the hand-written methods of the past.

This rapid increase in the amount of text, coupled with enormous advances in technology, has caused considerable attention to be paid to the subject of translation of text from its source language to a target language(s). Considerable research has been done in universities as well as in private and governmental laboratories, which has been devoted to trying to figure out how translation can be accomplished without the intervention of a human translator.

Computer-based systems have been devised which attempt to perform machine translation (MT). Such computer systems are programmed so as to attempt to automatically translate source text as an input into target text as an output. However, researchers have discovered that such computer systems for automatic machine translation are impossible to implement using present technology and theoretical understanding. No system exists today which can perform the machine translation of a source natural language to a target natural language without some type of editing by expert editorsltranslators. One method is discussed below.

In a process called pre-editing, source text is initially reviewed by a source editor. The task of the source editor is to make changes to the source text so as to bring it into conformance with what is known to be the optimal state for translation by the machine translation system. This conformance is learned by the source editor through trial and error.

The pre-editing process just described may go through iterations by additional source editors of increasing competence. The source text thus prepared is submitted for processing to the machine translation system. The output is target language text which, depending on the purposes of the translation of quality requirements of the user, may or may not be post-edited.

If the translation quality required must be comparable to that of proficient human translation, the output of machine translation will most likely have to be post-edited by a competent translator. This is due to the complexity of human language and the comparatively modest capabilities of the machine translation systems that can be built with present technology, within natural limitations of time and resources, and with a reasonable expectation of meeting cost-effectiveness requirements. Most of the modest systems that are built require, indeed, the postediting activity, intended to approximate, by whatever measure, the quality levels of purely human translation.

Once such system is the KBMT-89 designed by the Center for Machine Translation, Carnegie Mellon University, which translates English to Japanese and Japanese to English. It operates with a knowledge based domain model which aids in interactive disambiguation (i.e., editing of the document to make it unambiguous). However, this interactive disambiguation is not typically done interactively with an author. Once the system finds an ambiguous sentence that it cannot disambiguate, it must stop the process and resolve ambiguities by asking a author/translator a series of multiple-hoice questions. In addition, since the KBMT-89 does not utilize a well-defined controlled input language the socalled translator assisted interactive disambiguation produces text which requires postediting.

In view of the above, it would be advantageous to have a translation system that eliminates both pre- and post-editing.

SUMMARY OF THIE INVENTION

The present invention is a system of integrated, computer-based processes for monolingual document development and multilingual translation. An interactive computerized text editor enforces lexical and grammatical constraints on a natural language subset used by the authors to create their text, and supports the authors in disambiguating their text to ensure its translatability. The resulting translatable source language text undergoes machine translation into any one of a set of target languages, without the translated text requiring any post-editing.

BRIEF DESCRIFIION OF THE DRAWINGS

FIGS. 1(a) and 1(b) are high level block diagrams of the architecture of the present invention.

DETAILED DESCREflON OF THE PRESENT INVENTION

I. Integrated System Overview

The computer-based system of the present invention provides functional integration of:

1) An authoring environment for the development of documents, and
2) A module for accurate, machine translation into multiple languages without pre- or post-editing.

Utilizing this technology in the production of multilingual documentation, the user is assured of consistently accurate, timely, cost-efficient translation, whether in small or large volumes, and with virtually simultaneous release of information in both the source language and the languages targeted for translation.

The decision to lirdc the source language authoring function together with the translation function is based on two principles:

1) In a multinational, multilingual business environment, the information is not considered to be fully developed until it is deliverable in the various languages of the users.
2) Combining the authoring and translation processes within a unified framework leads to efficiency gains that cannot otherwise be achieved.

Figure 1A:
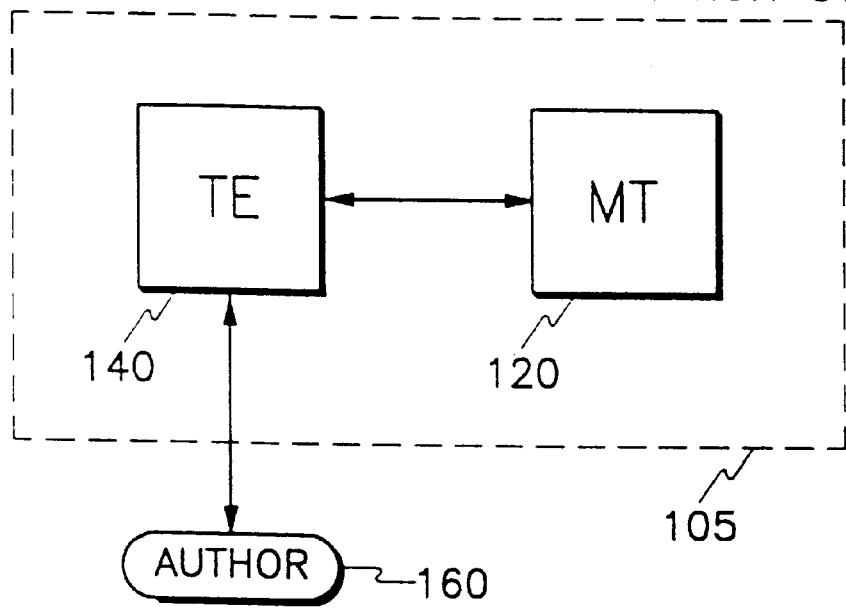

FIG. 1(a) shows a high level block diagram of the Integrated Authoring and Translation System (AATS) 105. The IATS 105 provides a specialized computing environment dedicated to supporting an organization in authoring documentation in one language and translating it into various others. These two distinct functions are supported by an integrated group of programs, as follows:

1) Authoring—one subgroup of the programs provides an interactive computerized Text Editor (TE) 140 which enables authors to create their monolingual text within the lexical and grammatical constraints of a domain-bound subset of a natural language, the subset designated Constrained Source Language (CSL). Additionally, the TE 140 enables authors to further prepare the text for translation by guiding them through the process of text disambiguation which renders the text translatable without pre editing;
2) Translation—another subgroup of the programs provides the Machine Translation (M) 120 function, capable of translating the CSL into as many target languages as the generator module has been programmed to generate, with the resulting translation requiring no post-editing.

For a system that features translation as a central component, the integration of the authoring and the translation functions of the present invention within a unified framework is the only way devised to date that eliminates both pre- and postediting.

The text (TE) 140 is a set of tools to support the authors and editors in creating documents in CSL. These tools will help authors to use the appropriate CSL vocabulary and grammar to write their documents. The TE 140 communicates with the author 160 (and vice versa) directly.

Figure 1B:
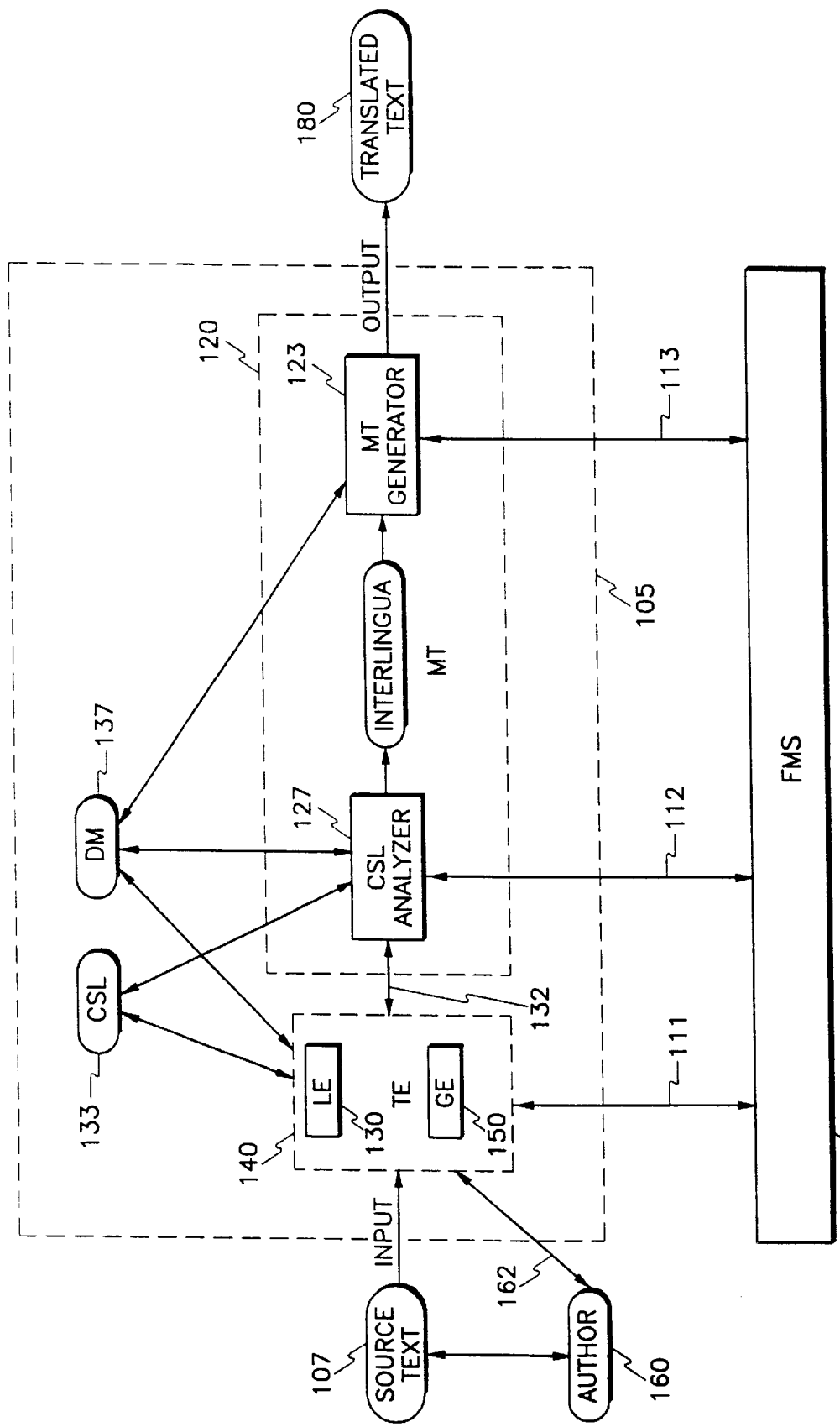

Referring to FIG. 1(b), the IATS 105 is divided into four main parts to perform the authoring and translation functions: (1) a Constrained Source Language (CSL) 133, (2) a Text Editor (LE) 140, (3) a MT 120, and (4) a Domain Model (DM) 137 The Text Editor 140 includes a Language Editor 130 and a Graphics Editor 150. In addition, a File Management System (FMS) 110 is also provided for controlling all processes.

The CSL 133 is a subset of a source language whose grammar and vocabulary cover the domain of the author's documentation which is to be translated. The CSL 133 is defined by specifications of the vocabulary and grammatical constructions allowed so that the translation process is made possible without the aid of pre- and post editing.

The TE 140 is a set of tools to support authors and editors in creating g documents in CSL. These tools will help authors to use the appropriate CSL vocabulary and grammar to write their documents. The LE 130 communicates with the author 160 (and vice versa) via the text editor 140. The author has bidirectional communication via line 162 with the text editor 140. The LE 130 informs the author 160 whether words and phrases that are used are in CSL. The LE 130 is able to suggest synonyms in CSL for words that are relevant to the domain of information which includes this document, but are not in CSL. In addition, the LE 130 tells an author 160 whether or not a piece of text satisfies CSL grammatical constraints. It also provides an author with support in disambiguating sentences that may be syntactically correct but are semantically ambiguous.

The MT 120 is divided into two parts: a MT analyzer 127 and a MT generator 123. The MT analyzer 127 serves two purposes: it analyzes a document to ensure that the document unambiguously conforms to CSL and produces interlingua text. The analyzed CSL-approved text is then translated into a selected foreign (target) language 180. The MT 120 utilizes an Interlingua-based translation approach. Instead of directly translating a document to another foreign language, the MT generator 123 transforms the document into a language-independent, computer-readable form called Interlingua and then generates translations from the Interlingua text. As a result, translated documents will require no postediting. A version of the MT 120 is created for each language and will consist primarily of a set of knowledge sources designed to guide the translation of Interlingua text to foreign language text. In particular, for every new target language, a new MT generator 123 must be individually developed.

When fully functional, the LE 130 will sometimes need to ask the author 160 to choose from alternative interpretations for certain sentences that satisfy CSL grammatical constraints but for which the meaning is unclear. This process is known as disambiguation. After the LE 130 has determined that a particular part of text uses only CSL vocabulary and satisfies all CSL grammatical constrains, then the text will be labeled CSL-approved, pending this disambiguation. As explained below, disambiguation will not require any changes to the author-visible aspects of the text. After the text has been disambiguated it will be ready for translation into the target language 180.

In practice, the LE 130 is built as an extension to the text editor 140 which provides the basic word processing functionality required by authors and editors to create text and tables. The graphics editor 150 is used for creating graphics. The graphics editor 150 provides a means for accessing the text labels on graphics through the text editor 140, so these text labels can be CSL, approved as well.

The LE 130 (via text editor 140) communicates with the MT analyzer 127 and, through it, with the DM 137 during disambiguation via bidirectional socket-to-socket line 132. In the preferred embodiment of the present invention, the DM is one of the knowledge bases that feeds the MT analyzer 127. The DM 137 is a symbolic representation of the declarative knowledge about the CSL vocabulary used by the MT analyzer 127 and the LE 130.

Figure 2:
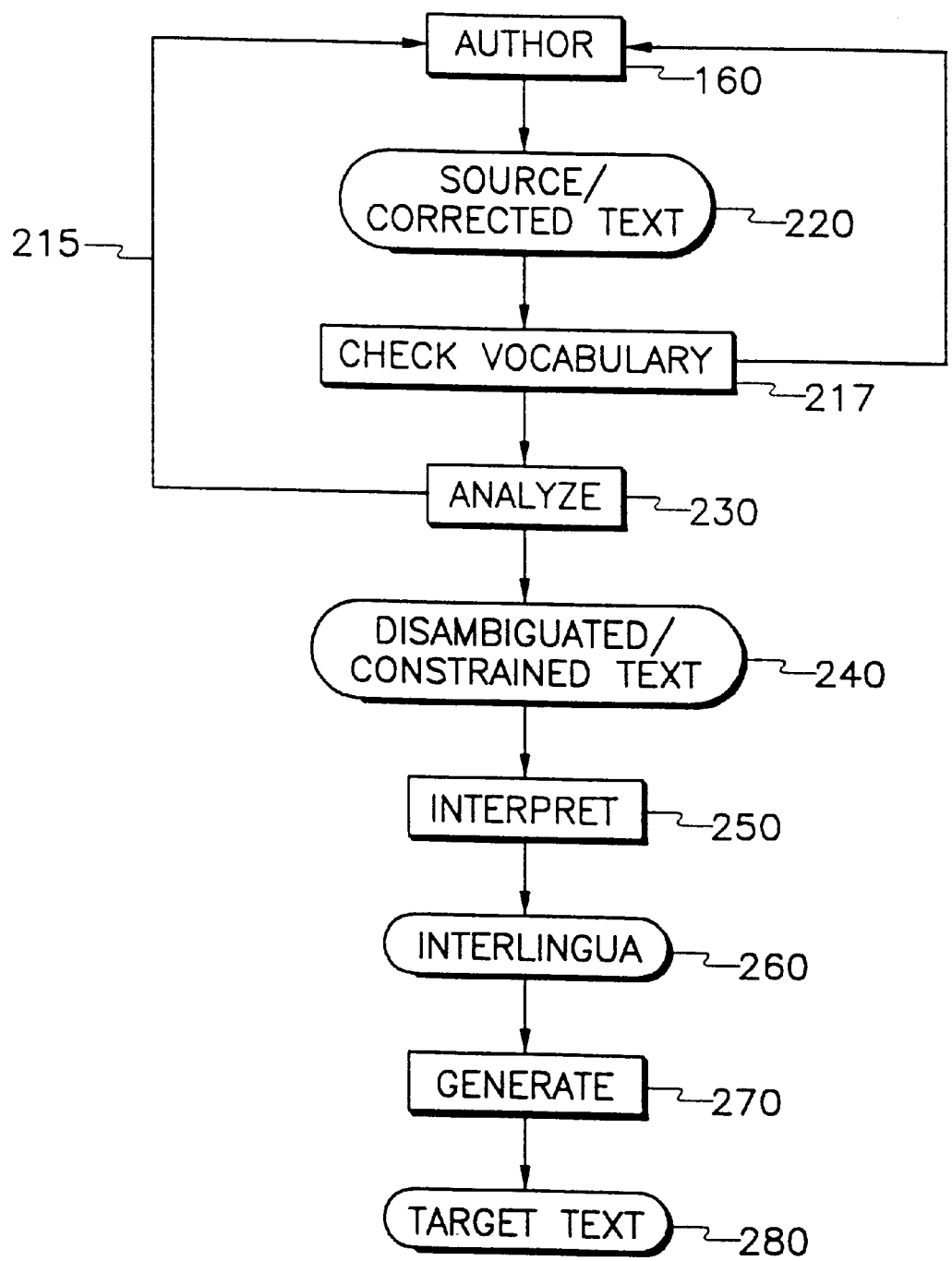
FIG. 2 is a high level flowchart of the operation of the present invention.

FIG. 2 shows a high level flowchart of the operation of IATS 105. The MT 120, LE 130, text editor 140, and graphics editor 150 are all controlled by the FMS 110. Control lines 111–113 provide the necessary control information for proper operation of IATS 105.

Initially, the author 160 will use the FMS 110 to choose a document to edit, and the FMS 110 will start the text editor 140, displaying the file for the specified document. Via the text editor 140, the author enters text that may be unconstrained and ambiguous text into the IATS 105, as shown in blocks 160 and 220. The author 160 will use standard editor commands to create and modify the document until it is ready to be checked for CSL compliance. Note that is it anticipated that authors will mostly enter text that is substantially prepared with the CSL constraints in mind. The text will then be modified by the author in response to system feedback, based on violations to the predetermined lexical and grammatical constraints, to conform to the CSL. This is, of course, much more efficient than initially entering totally unconstrained text. However, the system will operate properly even if totally unconstrained text is entered from the start.

The author's communication with the LE 130 consists of mouse click or keystroke commands. However, one should note that other forms of input may be used, such as but not limited to the use of a stylus, voice, etc., without changing the scope or function of the present invention. An example of an input is a command to perform a CSL check or to find the definition and usage example for a given word or phrase.

The CSL text that may contain residual ambiguity or stylistic problems is analyzed for conformity with CSL and checked for compliance with the grammatical rules contained in the knowledge bases, as shown in block 230. The author is provided feedback to correct any mistakes via feedback line 215. Specifically, the LE 130 provides information regarding non-CSL words and phrases and sentences to the author 160. Finally, the text is checked for any ambiguous sentences. The LE prompts the author to select an appropriate interpretation of a sentence's meaning. This process is repeated until the text is fully disambiguated.

Figure 3:
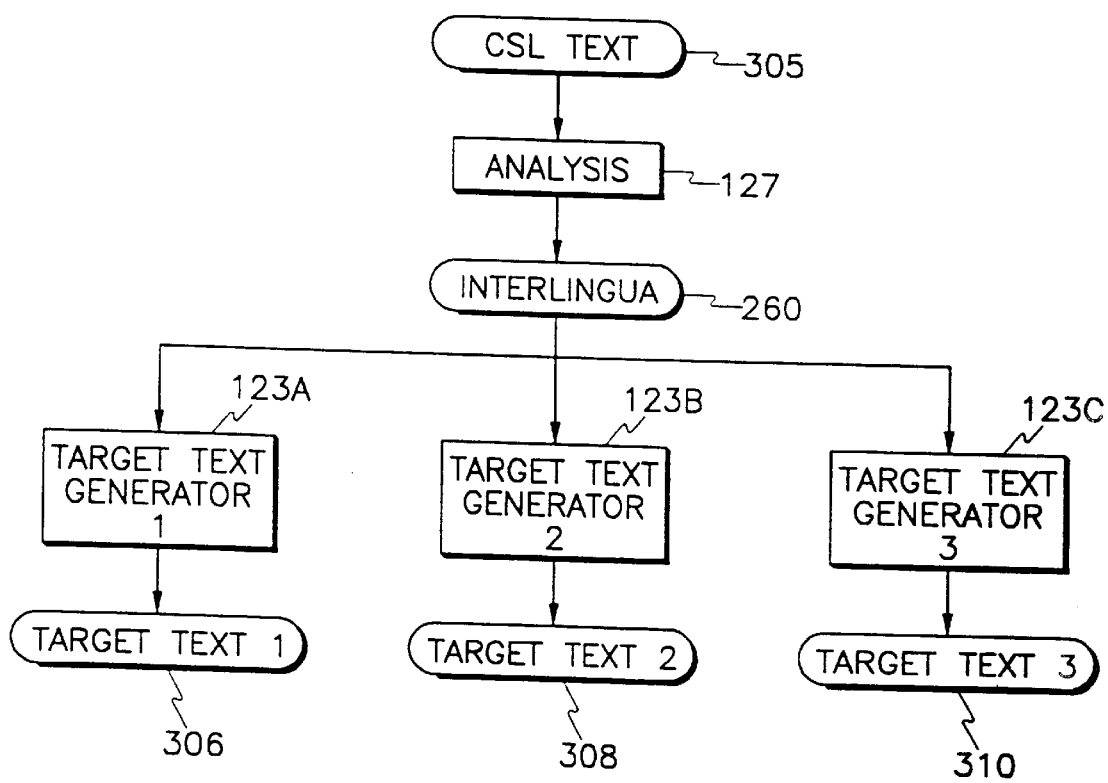
FIG. 3 is a high level informational flow and architectural block diagram of MT 120.

Once the author has made all the necessary corrections to the text, and the analysis phase 230 has completed, the disambiguated/constained text 240 is passed to the MT analyzer and interpreter 250. The interpreter resides in the MT analyzer 127 together with the syntactic part of the analyzer and translates the disambiguated/constrained text 240 into interlingua 260. The interlingua 260 is in turn translated by generator block 270 into the target text 280. As shown in FIG. 3, the interlingua text 260 is in a form that can be translated to multiple target languages 306–310.

By requiring and enabling the author to create documents that conform to specific vocabulary and grammatical constraints, it is feasible to perform the accurate translation of constrained-language texts to foreign languages with no postediting required. Postediting is not required since the LE vocabulary check block 217 and analysis block 230 have caused the author to modify and/or disambiguate all possibly ambiguous sentences and all non-translatable words from the document before translation.

II. Detailed Description of the Functional Blocks

In a preferred embodiment, each author will have sole use of a DECstation with 32 Meg of RAM, a 400-megabyte disk drive, and a 19-inch color monitor. Each workstation will be configured for at least 100 Meg of swap from its local disk. In addition to the authors' workstations, DECservers will be used as file servers, one for every two authoring groups, for a total of no more than 45 users per file server. Furthermore, authoring workstations will reside on an Ethernet local network. The system uses the Unix operating system (a Berkeley Standard Distribution (BSD) derivative is preferable to a System V (SYSV) derivative). A C programming language compiler and OSF/Motif libraries are available. The LE will be run within a Motif window manager. It should be noted that the present invention is not limited to the above hardware and software platforms and other platforms are contemplated by the present invention.

A. Text Editor

The preferred embodiment of the present invention provides a text editor 140 which allows the author to input information that will eventually be analyzed and finally translated into a foreign language. Any commercially available word processing software can be used with the present invention. A preferred embodiment uses a SGML text editor 140 provided by ArborText (ArborText Inc., 535 West William St., Ann Arbor, Mich. 48103). The SGML text editor 140 provides the basic word processing functionality required by authors and editors, and is used with software by InterCap (of Annapolis, Maryland) for creating graphics.

The present invention utilizes a SGML text editor 140 since it creates text using Standard Generalized Markup Language (SGML) tags. SGML is an International Standard markup language for describing the structure of electronic documents. It is designed to meet the requirements for a wide range of document processing and interchange tasks. SGML tags enable documents to be described in terms of their content (text, images, etc) and logical structure (chapters, paragraphs, figures, tables, etc.) In the case of larger, more complex, electronic documents, it also makes it possible to describe the physical organization of a document into files. SGML is designed to enable documents of any type, simple or complex, short or long, to be described in a manner that is independent of both the system and application. This independence enables document interchange between different systems for different applications without misinterpretation or loss of data.

SGML is a markup language, that is, a language for "marking up" or annotating text by means of or by using coded information that adds to the conventional textual information conveyed by a given piece of the text. In most cases it takes the form of sequences of characters at various points throughout an electronic document. Each sequence is distinguishable from the text around it by the special characters that begin and end it. The software can verify that the correct markup has been inserted into the text by examining the SGML tags upon request. The markup is generalized in that it is not specific to any particular system or task. For a more in depth discussion of SGML tags see International Standard (ISO) 8879, Information processing—Text and office systems–Standard Generalized Markup Language (SGML), Ref. No. ISO 8879–1986(E).

The following capabilities are possible due to the use of the SGML tags:

(1) dividing documents into fragments or translatable units. The text editor 140 software uses both punctuation and SGML tags to recognize translatability units in the source input text (e.g., an SGML tag is necessary to identify section titles);

(2) shielding (insulating) units that will not be translated. Although the system is based on the premise that all words and sentences will belong to the constrained language that cannot be predicted in advance (for example, names and addresses) or classes of vocabulary that cannot (readily) be exhaustively specified (for example, part numbers, error messages from machinery). SGML tags can be put around these items to indicate to the system that they are exempt from checking;

(3) identifying contents (e.g., part number) as discussed in (2);

(4) allowing partial sentences to be translated (e.g., bulleted items);

(5) assisting in translating tables (one cell at a time) by identifying structure of text. This feature is similar to that described in (1);

(6) assisting the parsing process (described below) through (2), (3), (4), (5);

(7) assisting in disambiguation by providing a means of inserting invisible tags into the source text so as to indicate the correct interpretation of an ambiguous sentence;

(8) assisting in translating currencies and mathematical units through the identification of specific types of text that require special treatment.

(9) providing a means of labeling a portion of text as translatable. In other words, certifying that a portion of text has advanced through the process outlined below and that the text is unambiguous constrained text that can be translated without postediting.

In the past, authors have created (by way of the text editor 140) electronic documents (text only—no graphics) that represented a complete "book." This implies that all work is done by one writer, and that the information created is not easily reused. The present invention, however, compiles (or creates) books (manuals, documents) from a set of smaller pieces or information elements, which implies that the work can be done by multiple writers. The result of this invention is enhanced reusability. An information element is defined as the smallest stand-alone piece of service information about a specialized domain. It should be noted, however, that although a preferred embodiment utilizes information elements, the present invention can produce accurate, unambiguous translated documents without the use of information elements.

Figure 4:
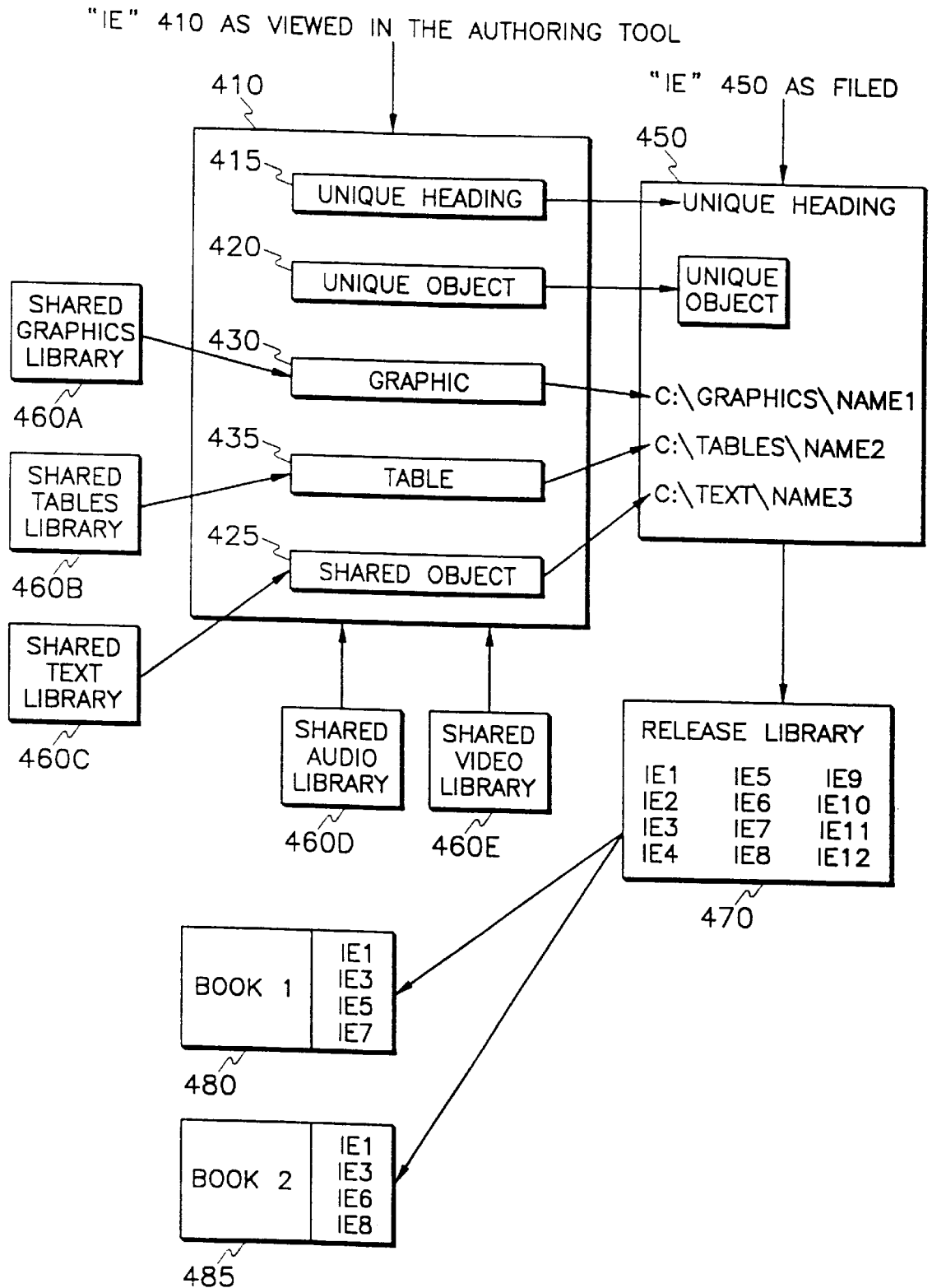
FIG. 4 shows an example of an information element.

FIG. 4 shows an example of an information element 410 which includes a "unique" heading 415, a "unique" block of text 420, a "shared" graphic 430, a "shared" table 435, and a "shared" block of test 425.

"Unique" information is that information which applies only to the information element in which it's contained. This implies that the "unique" information is filed as part of the information element 450.

A "shared" object (a graphic, table, or block of text) is information that is "referenced" in the information element. The content of "shared" objects are displayed in the authoring tool but only "pointed to" in the filed information element 450.

"Shared" objects differ from information elements in that they do not stand-alone (i.e., they do not convey enough information by themselves to impart substantive information). Each "shared" object is in itself a separate file as shown in block 450.

Information elements are formed by combining "unique" blocks of information (text and/or tables) with one or more "shared" objects. Note that "unique" heading 415 and "unique" text 420 is combined with "shared" graphic 430, "shared" table 435, and "shared" text 425. A set of one or more information elements make up a complete document (book).

"Shared" objects are stored in "shared" libraries. Library types include "shared" graphic libraries 460a, "shared" tables libraries 460b, "shared" text libraries 460c, "shared" audio libraries 460d, and "shared" video libraries 460e. A shared object is stored only one time. When used in individual information elements, only "pointers" to the original shared object will be placed in the information shared file 450. This minimizes the amount of disk space that will be required. When the original object is changed, all those information elements that "point" to that object are automatically changed. A shared object can be used in any publication type.

A "shared information element" is an information element that is used in more than one document. For example, the same four information elements in release library 470 are used to create portions of documents 480 and 485.

All communication between the author and the LE 130 will be mediated by an LE User Interface (UI), implemented as either an extension of standard SGML Editor facilities such as menu options, or in separate windows. The UI provides and manages access to and control of the CSL checkers and CSL vocabulary look-up, and it is the primary tool enabling users to interact with the CSL LE. Although the term "user interface" is often used in a more general sense to refer to the interface to an entire software system, here the term will be restricted to mean the interface to the CSL checkers, vocabulary look-up facility, and the disambiguation facility.

Among other things, the UI must provide clear information regarding (a) the actions the LE is taking, (b) the result of these actions, and (c) any ensuing actions. For example, whenever an action initiated through the UI introduces more than a very brief, real-time pause, the UI should inform the author of a possible delay by means of a succinct message.

The author can invoke LE functionality by choosing an option from a pull-down menu in text editor 140. The available options allow the author to initiate and view feedback from CSL checking (both vocabulary and grammar checking) and from vocabulary look-up. The author can request that checking be initiated on the currently displayed document or request vocabulary look-up on a given word or phrase.

The UI will clearly indicate each instance of non-CSL language found in the document. Possible ways of indicating non-CSL language include the use of color and changes to font type or size in the SGML Editor window. The UI will display all known information regarding any non-CSL word. For example, in appropriate cases the UI will display a message saying that the word is non-CSL but has CSL synonyms, as well as a list of those synonyms.

In cases where a Vocabulary Checker report includes a list of alternatives to the non-CSL word in focus (for example, spelling alternatives or CSL synonyms), the author will be able to select one of those alternatives and request that it be automatically replaced in the document. In some cases, the author may have to modify (i.e., add the appropriate ending) the selected alternative to ensure that it is in the appropriate form.

When an author requests vocabulary information, the UI will display spelling alternatives, synonyms, a definition, and/or a usage example for the item indicated.

The author can move quickly and easily between checker information and vocabulary look-up information inside the UI. This enables the author to perform information searches (e.g., synonym look-up) during the process of changing the documents to remove non-CSL language.

In most cases, the UI provides automatic replacement of non-CSL vocabulary with CSL vocabulary, with no need for the user to modify the CSL word to ensure that it is in the appropriate form. However, there are some cases in which the vocabulary checker (described below), which does no parsing of a document, will not be able to identify the correct form to provide. Consider the following caption, in the case where the verb "view" is not in CSL, but has the CSL synonym "see":

Direction of Crankshaft Rotation (when viewed from flywheel end)

The Vocabulary Checker will not know if "saw" or "seen" should be offered as a synonym for "viewed." Of course, in this case a reasonable course of action might be to offer both possibilities and allow the author to choose the appropriate one. Because there is no certainty that every case will allow a presentation that enables the author to order a direct replacement. LE 130 provides a list of replacement options in the correct form where possible. There may be cases, though, when the author will find it necessary to edit a suggested CSL word or phrase before requesting that it be put into the document.

Finally, the LE UI provides support for disambiguating the meaning of sentences. It does this by providing a list of possible alternative interpretations to the author, allows the author to select the appropriate interpretation, and then tags the sentence so as to indicate that authors selection.

C. File Management System

The File Management System (FMS) 110 serves as the authors' interface to the IE Release Library 470 and the SGML text editor 140. Typically, authors will select an IE to edit by indicating the file for that IE in the FMS interface. The FMS 110 will then initiate and manage an SGML Editor session for that IE. Finished documents will be forwarded to a human editor or Information Integrator via FMS-controlled facilities.

D. Constrained Source Language (CSL)

Given the complexity of today's technical documentation, high quality machine translation of natural language unconstrained texts is practically impossible. The major obstacles to this are of a linguistic nature. The crucial process in translating a source text is that of rendering its meaning in the target language. Because meaning lies under the surface of textual signals, such overt signals have to be analyzed. The meaning resulting from this analysis is used in the process of generating the signals of the target language. Some of the most vexing translation problems result from those features inherent in language which hinder analysis and generation.

A few of these features are:

1. Words with more than one meaning in an ambiguous context

Example: Make it with light material.

[Is the material "not dark" or "not heavy"?]

2. Words of ambiguous makeup

Example: The German word "Arbeiterinformation" is either

"information for workers" [Arbeiter+Information] or

"formation of female workers" [Arbeiterin+Formation]

3. Words which play more than one syntactic role

Round may be a noun (N), a verb (V), or an adjective (A):

(N) Liston was knocked out in the first round.

(V) Round off the figures before tabulating them.

(A) Do not place the cube in a round box.

4. Combinations of words which may play more than one syntactic role each

Example: British Left Waffles on Falklands.

[If Left Waffles is read as N+V, the headline is about the British Left]

[If Left Waffles is read as V+N, the headline is about the British]

5. Combinations of words in ambiguous structures

Example: Visiting relatives can be boring.

[Is it the "visiting of relatives" or the "relatives who visit" which can be boring?]

Example: Lift the head with the lifting eye.

[Is the "lifting eye" an instrument or a feature of the "head"?]

6. Confusing pronominal reference

Example: The monkey ate the banana because it was . . .

[What does "it" refer back to, the monkey or the banana?]

Generation problems add to the above, increasing the overall difficulty of machine translation.

The magnitude of the translation problems is considerably lessened by any reductions of the range of linguistic phenomena the language represents. A sublanguage covers the range of objects, processes and relations within a limited domain. Yet a sublanguage may be limited in its lexicon while it may not necessarily be limited in the power of its grammar. Under controlled situations, a strategy aimed at facilitating machine translation is that of constraining both the lexicon and the grammar of the sublanguage.

Constraints on the lexicon limit its size by avoiding synonyms, and control lexical ambiguity by specializing the lexical units for the expression of, as far as possible, one meaning per unit. It is easy to imagine how these restrictions would avoid the problems exemplified in 1, 2, and 4, above. Grammatical constraints may simply rule out processes like pronominalization (6 above) or require that the intended meaning be made clearer either through addition or repetition of otherwise redundant information or through rewrite. The following example sets the parameters for application of this requirement:

Unconstrained, ambiguous English (which can be interpreted as either A, B 1, or B2 below): Clean the connecting rod and main bearings.

Unambiguous English version A: Clean the connecting rod bearings and the main bearings.

Unambiguous English version Bi: Clean the main bearings and the connecting rod.

Unambiguous English version B2: Clean the main bearings and the connecting rods.

The number and types of lexical and grammatical constraints may vary widely depending on the purpose of development of the constrained sublanguage.

In view of the above, the present invention limits the authoring of documents within the bounds of a constrained language. A constrained language is a sublanguage of a source language (e.g., American English) developed for the domain of a particular user application. For a discussion generally of constrained or controlled languages see Adriaens et al, From *COGRAM to ALCOGRAM: Toward a controlled English Grammar Checker,* Proc. of Coling-92, Nantes (Aug. 23–28, 1992) which is incorporated by reference. In the context of machine translation, the goals of the constrained language are as follows:

1. To facilitate consistent authoring of source documents, and to encourage clear and direct writing; and 2. To provide a principled framework for source texts that will allow fast, accurate, and high-quality machine translation of user documents.

The set of rules that authors must follow to ensure that the grammar of what they write conforms to CSL will be referred to as CSL Grammatical Constraints. The computational implementation of CSL grammatical constraints used to analyze CSL texts in the MT component will be referred to as the CSL Functional Grammar, based on the well known formalisms developed by Martin Kay and later modified by R. Kaplan and J. Bresnan (see Kay, M., "Parsing in Functional Unification Grammar," in D. Dowty, L Kartnen and A. Zwicky (eds.), Natural Lnguage Parsing: Psychological. Computational. and Theoretical Perspectives, Cambridge, Mass.: Cambridge University Press, pgs. 251–278 (1985) and Kaplan R. and J. Bresnan, "Lexical Functional Grammar: A Formal System for Grammatical Representation," in J. Bresnan (ed.), The Mental Representation of Grammatical Relations, Cambridge, Mass.: MIT Press, pgs. 172–281 (1982) both of which are incorporated by reference.

In the rest of this document, we refer frequently to the notion that a word or phrase may be "in CSL" or "not in CSL." Below we will describe the assumptions about the type of vocabulary restrictions that will be imposed by CSL and to clarify the use of the expression "in CSL."

The same word or phrase in English can have many different meanings; for example, a general purpose dictionary may list the following definitions for the word "leak":

(1) verb: to permit the escape of something through a breach or flaw;

(2) verb: to disclose information without official authority or sanction;

and (3) noun: a crack or opening that permits something to escape from or enter a container or conduit.

Each of these different meanings is referred to as a "sense" of the word or phrase. Multiple senses for a single word or phrase can cause problems for an MT system, which doesn't have all the knowledge that humans use to understand which of several possible senses is intended in a given sentence. For many words, the system can eliminate some ambiguity by recognizing the part of speech of the word as used in a particular sentence (noun, verb, adjective, etc.). This is possible because each definition of a word is particular to the use of that word as a certain part of speech, as indicated above for "leak."

However, to avoid the kinds of ambiguity that the MT 120 cannot eliminate, the CSL specification strives to include a single one sense of a word or phrase for each part of speech. Thus, when a word or phrase is "in CSL," it can be used in CSL in at least one of its possible senses. For example, an author writing in CSL may be allowed to use "leak" in senses (1) and (3) above, but not in sense (2). Saying that a word or phrase is "in CSL" does not mean that all possible uses of the word or phrase can be translated.

If a word or phrase is in CSL, then all forms of that word or phrase that can express its CSL sense(s) are also in CSL. In the above example, an author may use not only the verb "leak" but also the related verb forms "leaked," "leaking" and "leaks." If a word or phrase with a noun sense is part of CSL, both its singular and plural forms may be used. Note, however, phrases which function as more than one part of speech are uncommon. This heuristic is therefore less relevant in the case of an ambiguous phrase.

A vocabulary is the collection of words and phrases used in a particular language or sublanguage. A limited domain will be referred to by means of a limited vocabulary which is used to communicate or express information about a limited realm of experience. An example of a limited domain might be farming, where the limited vocabulary would include terms concerning farm equipment and activities. The MT component will operate on more than one kind of vocabulary. The words and phrases for machine translation will be stored in the MT lexicon. The vocabulary can be divided into different classes: (1) functional items; (2) general content items; and (3) technical nomenclature.

Functional items in English are the single words and word combinations which serve primarily to connect ideas in a sentence. They are required for almost any type of written communication in English. This class includes prepositions (to, from, with, in front of, etc.), conjunctions (and, but, or, if, when, because, since, while, etc.), determiners (the, a, your, most of), pronouns (it, something, anybody, etc.), some adverbs (no, never, always, not, slowly, etc.), and auxiliary verbs (should, may, ought, must, etc.).

General content words are used in large measure to describe the world around us; their main use is to reflect the usual and common human experience. Typically, documents focus on a very specialized part of the human experience (e.g., machines and their upkeep). As such, the general vocabulary will be relatively restricted for MT.

The technical nomenclature comprises technical content words and phrases, and user application specific vocabulary. Technical content items are words and phrases which are specific to a particular field of endeavor or domain. Most technical words are nouns, used to name items, such as parts, components, machines, or materials. They may, however, also include other classes of words, such as verbs, adjectives, and adverbs. Obviously, as these words are not used in common, everyday conversation, they contrast with general content words.

Technical content phrases are multiple-word sequences built up from all the preceding classes. These phrases are the most characteristic form of technical documentation vocabulary. The user application specific vocabulary is the part of the terminology that contains distinctly user application created words and complex terms. These include the following: product names, titles of documents, acronyms used by the user, and from numbers.

The development of a useful and complete vocabulary is important for any documentation effort. When documentation is subsequently translated, the vocabulary becomes an important resource for the translation effort. The MT 120 is designed to handle most functional items available in English, except those referring to very personal (it, me, my, etc.) or gender-based (hers, she, etc.) or other pronominal (it, them, etc.) usage. This will include a number of technical "borrowings" from English general words (such as "truck" or "length"). The vast majority of the constrained language vocabulary, then, will consist of the "special" (e.g., technical) terms of one or more words, which express the objects and processes of the special domain. To the extent that the vocabulary is able to express the full range of notions about the special domain, the vocabulary is said to be complete.

The development of a streamlined but complete vocabulary contributes greatly to the success of the IATS system 105. The constrained language, by specifying proper and improper use of vocabulary, will assure that the documents can be produced in a manner conducive to fast, accurate, and high-quality machine translation.

Voabulary items should reflect clear ideas and be appropriate for the target readership. Terms which are sexist, colloquial, idiomatic, overly complicated or technical, obscure, or which in other ways inhibit communication should be avoided. These and other generally accepted stylistic considerations, while not necessarily mandatory for MT-oriented processing, are nevertheless important guidelines for document production in general.

It should be noted that although the bulk of the discussion in this document concerning the constrained source language and/or language in general centers around American English, analogous comparisons can be made in connection with all other languages. There is nothing inherent about the system 100 described herein that requires American English to be the source language. In fact, the system 100 is not designed to work with American English as the only source language. However, the databases (e.g., the domain model) that interact with the LE 130 and MT 120 will have to be changed to correspond to the constraints of the particular source language.

The rules of standard American English orthography must be followed. Non-standard spellings, such as "thru" for "through," "moulding" for "molding," or "hodometer" for "odometer" are to be avoided. Capitalized words (e.g., On-ff, Value Planned Repair) should only be used to indicate special meaning of terms. These terms must be listed in the user application vocabulary. Such is also the case for non-standard capitalization usage (BrakeSaver). Likewise, abbreviations, when used (ROPS, API, PIN), must be listed in the user application specific vocabulary. The format for numbers, units of measurement, and dates must be consistent.

Constrained language recovery items should also be used according to their constrained language meaning. In doing so, the writer assures that the MT always translates a word by using the proper constrained language word sense. Some English words can also belong to more than one syntactic category. In the constrained language, all syntactically ambiguous words should be used in constructions that disambiguate them.

One difficult problem arising from the special nature of the domain is, in some fields, the frequent use of lengthy compound nouns. The modification relationships present in such compound nouns are expressed differently in different languages. Since it is not always feasible to recover these relationships from the source text and express them in the target language, complex compound nouns with the following characteristics may be listed in the MT lexicon:

Technical terms from the user application specific vocabulary; and

Compound terms consisting of more than one word.

Complicated noun-noun compounding should be avoided, if possible. However, with some items listed in the lexicon, the MT is capable of handling this important characteristic of documentation. Note that noun-noun compounding which is a very common feature of the English language, may not necessarily be a common feature of other language, and as such, the constraints under which the constrained language is created differs which the particular source language being utilized.

English is very rich in verb-particle combinations, where a verb is combined with a preposition, adverb, or other part of speech. As the particle can often be separated from the verb by objects or other phrases, this causes complexity and ambiguity in MT processing of the input text. Accordingly, verb-particle combinations should be rewritten wherever possible. This can usually be accomplished by using a single-word verb instead. For example, use:

"must" or "need" in place of "have to";

"consult" in place of "refer to";

"start the motor" in place of "turn the motor on";

Full terms and ideas should be used wherever possible. This is particularly important where misunderstandings may arise. For example, in the phrase:

"Use a monkey wrench to loosen the bolt . . . "

the word wrench must not be omitted. While most technically capable people would understand the implication without this word, it must be rendered explicit during the translation process. CIE text must have vocabulary which is explicitly expressed wherever possible; abbreviations or shortened terms should be rewritten into lexically complete expressions.

Consider another example:

"If the electrolyte density indicates that . . . "

Here the meaning is more explicit and complete when the idea is fully expressed:

"If measurement of the electrolyte density indicates that . . . "

Finally, in the following sentences have words or phrases missing, the underlined words are supplied to make the meaning more redundant:

Turn the start switch key to OFF and remove the key.

Pull the backrest (1) up, and move the backrest to the desired position.

Jump starting: make sure the machines do not touch each other.

When such "gaps" are filled, the idea is more complete and a meaningful translation by IATS 105 becomes more certain. Translation errors due to gaps are a common reason for postediting. Hence, gaps are disallowed.

Colloquial or spoken English often favors the use of very general words. This may sometimes result in a degree of vagueness which must be resolved during the translation process. For example, words such as conditions, remove; facilities, procedure, go, do, is for, make, get, etc. are correct but imprecise.

In a sentence like:

When the temperature reaches 32° F., you must take special precautions. the word "reaches" does not communicate whether the temperature is dropping or rising; one of these two terms would be more exact here, and the text just as readable.

Some languages make distinctions where English does not always do so; for example, we say oil for either a lubricating fluid, or one used for combustion; iwe say fuel whether or not it is diesel. Similarly, when the word door is used in isolation, it is not always possible to tell what kind of door is meant. A car door? A building door? A compartment door? Other languages may need to make these distinctions. Wherever possible, full terms should be used in English.

D. Domain Model

Knowledge-based Machine Translation (KBM1) must be supported by world knowledge and by linguistic semantic knowledge about meanings of lexical units and their combinations. A KBMT knowledge base must be able to represent not orly a general, taxonomic domain of object types such as "car is a kind of vehicle," "a door handle is a part of a door," artifacts are characterized by (among other properties) the property "made-by"; it must also represent knowledge about particular instances of object types (e.g., "IBM" can be included into the domain model as a marked instance of the object type "corporation") as well as instances of (potentially complex) event types (e.g., the election of George Bush as president of the United States is a marked instance of the complex action "to-elect"). The ontological part of the knowledge base takes the form of a multihierarcby of concepts connected through taxonomy-building links, such as is-a, part-of, and some others. We call the resulting structure a multihierarchy because concepts are allowed to have multiple parents on each link type.

The domain model or concept lexicon contains an ontological model, which provides uniform definitions of basic categories (such as objects, event-types, relations, properties, episodes, etc.) used as building blocks for descriptions of particular domains. This "world" model is relatively static and is organized as a multiply interconnected network of ontological concepts. The general development of an ontology of an application (sub)world in is well known in the art. See, for example, Brachman and Schmolze, *An Overview of the KL-ONE Knowledge Representation System, Cognitive Science,* vol. 9, 1985; Lenat, et al, Cyc: *Using Common Sense Knowledge to Overcome Brittleness and Knowledge Acquisition Bottlenecks,* Al Magazine, VI:65–85, 1985; Hobbs, *Overview of the Tacitus Project,* Computational Linguistics, 12:3, 1986; and Nirenburg et al, *Acquisition of Very Large Knowledge Bases: Methodology Tools and Applications,* Center for Machine Translation, Carnegie Mellon University (1988) all of which are incorporated herein by reference.

The ontology is a language-independent conceptual representation of a specific subworld, such as heavy equipment troubleshooting and repair or the interaction between personal computers and their users. It provides the semantic information necessary in the sublanguage domain for parsing source text in interlingua text and generating target texts from interlingua texts. The domain model has to be of sufficient detail to provide sufficient semantic restrictions that eliminate ambiguities in parsing, and the ontological model must provide uniform definitions of basic ontological categories that are the building blocks for descriptions of particular domains.

In a world model, the ontological concepts can be first subdivided into objects, events, forces (introduced to account for intentionless agents) and properties. Properties can be further subdivided into relations and attributes. Relations will be defined as mappings among concepts (e.g., "belongs-to" is a relation, since it maps an object into the set {*human *organization}), while attributes will be defined as mappings of concepts into specially defined value sets (e.g., "temperature" is an attribute that maps physical objects into values on the semi-open scale [O,*], with the granularity of degrees on the Kelvin scale). Concepts are typically represented as frames whose slots are properties fully defined in the system.

Domain models are a necessary part of any knowledge-based system, not only a knowledge-based machine translation one. The domain model is a semantic hierarchy of concepts that occur in the translation domain. For instance, we may define the object *O-VEHICLE to include *O-WHEELED-VEHICLE and *O-TRACKED-VEHICLE, and the former to include *O-TRUCK, *O-WHEELED-TRACTOR, and so on. At the bottom of this hierarchy are the specific concepts corresponding to terminology in CSL. We call this bottom part the shared K/DM. In order to translate accurately we must place semantic restrictions on the roles that different concepts play. For instance, the fact that the agent role of an *E-DRIVE action must be filled by a human is a semantic restriction placed on *O-VEHICLE, and automatically inherited by all types of vehicles (thus saving repetitious work in hand coding each example). The Authoring part of the domain model augments the K/DM with synonyms not in CSL and other information to provide useful feedback to the author as he or she composes each information element.

Figure 5:
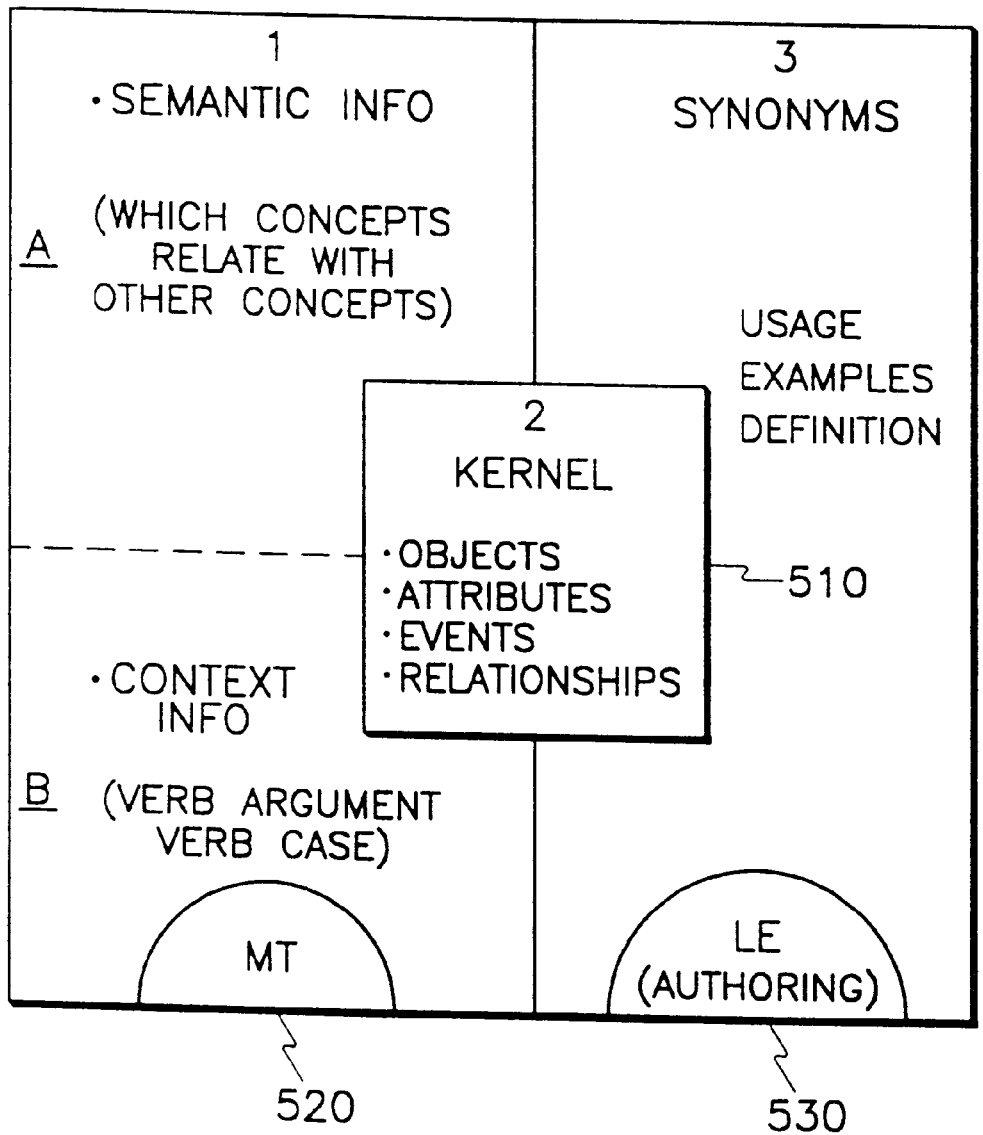
FIG. 5 is a block diagram of the domain model 500.

FIG. 5 conceptually illustrates the Domain Model (DM) used by the present invention. The DM 500 is a representation of the declarative knowledge about the CSL vocabulary used by the MT 120 and the LE 130. The DM 500 is made up of three distinct parts:

1. A Kernel Domain Model (K/DM) 510 contains all lexical information that is required by both the MT analyzer 127 and the LE 130; in particular, the kernel includes all CSL lexical items (words and phrases) with associated semantic concepts, parts of speech, morphological information, etc.
2. A MT Domain Model (MT/DM) 520 which contains information that is required only by the MT analyzer 127. The MT Domain Model is the hierarchy of concepts used for unambiguous mapping and semantic verification in translation. It includes selectional restrictions on concepts and a hierarchical classification of concepts.
3. A LE Domain Model (LE/DM) 530 contains information that is required only by the LE 130; this includes non-CSL synonyms for CSL lexical items, dictionary definitions of CSL lexical items, and examples of the CSL lexical items in use.

The Kernel/DM 510 will contain one lexical entry for every CSL lexical item (word or phrase). (A "lexical entry" consists of a lexical item—a word or phrase—and minimally its associated semantic concept and part of speech) for example, if the word "leak" is in CSL as both a noun and a verb, it would have two lexical entries.) Each lexical item will be updated with additional information required by the LE 130 and/or the MT 120, such as a definition and irregular morphological variants.

The shared K/DM 510 speeds up refinements and extensions of the CSL, saves duplication of effort in the authoring and translation components, and provides a human readable structure to facilitate maintenance and extensions.

The K/DM 510 is a lexicon containing both the syntactic and semantic information about terms (words and phrases) in the constrained language text. It is the central lexical knowledge source for the analysis side of the automated machine translation (MI) process. The K/DM 510 is also used as the basis for the LE/DM.

The K/DM 510 includes a separate entry for each term in each syntactic category. (hus, for a word like "truck," which is both a noun and a verb, ithere are two entries.) K/DM entries contain the following information:

root (e.g., "truck");
part of speech (e.g., N);
for content words, the concept or meaning (e.g., O-TRUCK);
morphological information (e.g., irregular inflections);
syntactic information (e.g., whether a noun is count or mass);
definitional information: short definitions and textual examples documenting the different senses and uses of the words, and a specification of the sense in which the word is to be used in the constrained language.

The DM 500 is defined in three sets of external human-readable files which can be read by the process(es) that require their use. Since the MT 120 and the LE 130 will be running in separate processes, the information in the model is represented internally in two forms: one for the parts of the DM required by the MT 120 and another for the part required by the LE 130. So the K/DM 510 is defined in a set of files which can be represented in both forms; the LE/DM 530 is only represented in the form used by the LE 130; and the MT/DM 520 is only represented in the form used by the MT 120. Described below are the external file formats, the content of the various parts of the DM, and the internal representation of the information used by the LE 130. Once again, the K/DM contains all information required by both the MT 120 and the LE 130. This includes a CSL lexical item—the base word, phrase, or quoted term and a semantic concept—the semantic concept associated with the lexical item, represented in a lexical entry by a "concept name." Further, it includes a part of speech—one of a fixed set of parts of speech (e.g., verb, adjective, etc.), a definition—a rough definition for general vocabulary terms, to clarify which of several senses a CSL lexical item may have, and irregular morphological variants—a listing of irregular morphological forms and the name of the morphological transformations for each. Examples of names of morphological transformations for verbs are "past", "third person singular present", "past participle", "present participle". The value of this field for the word "drive", for example, would be ((past drove) (past-participle driven)), indicating that those two forms of the verbs are irregular and all other forms are regular. Finally, the K/DM includes typographical restrictions—e.g., if the lexical item must be in all capitals, have the first character capitalized, etc.

The MT/DM 520 contains information required only by the MT 120. This includes: selectional restrictions on concepts and hierarchical classification of concepts for organization and inheritance of selectional restrictions.

The LE/DM 530 will contain non-CSL synonyms to help the authors to choose valid CSL lexical items. Together, the Kernel and the LEIDM will contain all information and all restrictions required to characterize the CSL lexicon in support of the LE Vocabulary Checker (described below). The LE/DM contains additional information required only by the LE Vocabulary Checker. This includes: a dictionary definition—the definition of the word or phrase that will be presented to authors by the LE, non-CSL synonyms—synonyms for the CSL lexical items that authors might use in writing documents, and a usage example—an example of the word or phrase in a CSL sentence, for presentation to the authors by the LE.

The purpose of including this information in the LE/DM is to help the authors ensure that their writing is made up of valid CSL words and phrases. The dictionary definitions and usage examples will help the authors ensure that they are using a word or phrase of a part of speech and with a meaning that is permitted in CSL; however, dictionary definitions or usage examples will not be required for every CSL lexical item. Rather, they will be required only for the small percentage of ambiguous or vague terms whose CSL meaning will not be immediately clear to authors. This probably amounts to less than half of the lexical items in the DM. For example, function words like "for" and "the" will not require definitions or examples; many technical terms, especially those with very specific technical meanings, may not require definitions or examples either.

The non-CSL synonyms in the LEIDM will help authors who write a non-CSL word or phrase to choose a synonymous or related CSL word or phrase with which to replace it. It is desirable for the vocabulary checker to provide information about not only synonyms which are the same part of speech as the non-CSL word with which they are synonymous, but also about related words that might aid authors in rewording sentences. If the latter are included, the LEIDM must contain information about these related words in addition to the mandatory content.

E. Language Editor

Referring to FIG. 1(b), the constrained language editor (LE) 130 is a set of tools to support authors and editors in creating documents within the bounds of CSL. These tools will help an author to use the appropriate CSL vocabulary and grammar to write service documentation. The LE 130 is built as an "extension" of the SGML text editor 140. Although the LE 130 uses the same communication channels as the SGML text editor 140, the functions of the two are mutually exclusive. However, the user interface used to interact with the LE 130 is a "seamless extension" of the SGML text editor interface.

The author 160 creates documents in the SGML text editor 140 and invokes the LE 130. The LE 130 informs the author whether individual words in a document are non-CSL, and will be able to suggest synonyms in CSL for words that are relevant to the user application information domain, but are not in CSL. In addition, the LE 130 tells the author whether or not the text in a file satisfies CSL syntactic constraints.

The LE 130 software includes the following: a Vocabulary Checker, a Grammar Checker, including an interface through the MT Syntactic Analyzer, which will provide the core grammar checking functionality, and a User Interface (UI). In addition, the CSL vocabulary information used by the CSL LE will be represented in the KIDM and the LE/DM.

The LE 130 will certify that all vocabulary and sentence structures in a document conform to the CSL specification. The LE 130 marks the document with an SGML tag that represents this CSL approval. Checking must be performed on all text in a document, which includes the following: sentences, headings, list items, captions, call-outs in graphics, and information in tables.

Since the present invention is based on the premise that authors should be productive as possible during a CSL checking session, and that authors should not have to work multiple authoring documents at once, a batch mode of operation, which requires a user to submit a document for processing and wait until the entire document is finished before he or she gets any feedback, is not appropriate. The LE 130 provides an interactive mode of operation for vocabulary checking, grammar checking, and interactive disambiguation.

Figure 6:
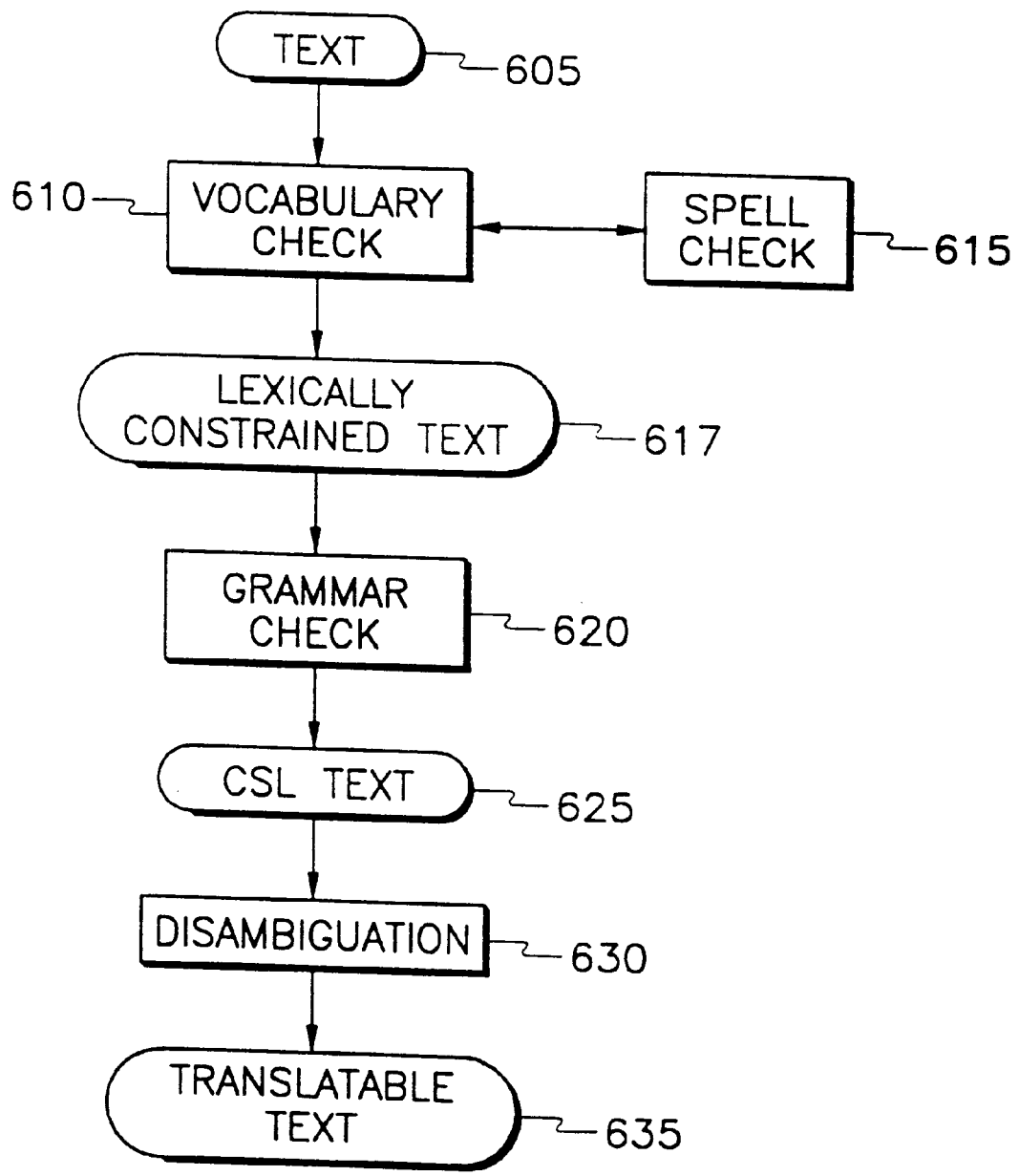
FIG. 6 is a high level flow diagram of the operation of the language editor 130.

FIG. 6 shows a high level flow chart of the operation of the LE 130. The LE 130 takes in as input text 605, which may be ambiguous and unconstrained. The potentially ambiguous unconstrained input text 605 is first checked with a vocabulary checker 610 which performs its functions (as described below) with the aid of a spell checker 615. (Ihe services of the spell checker happen to be rendered in this embodiment by the spell checker regularly featured by the host TE 140.) Once the vocabulary checker 610 has completed its check and made all necessary corrections (with the aid of the author) then the lexically constrained text 617 is supplied to a grammar checker 620. The grammar checker 620 produces syntactically correct CSL text 625. The constrained syntactically correct text 625 is then disambiguated, as shown in block 630. The result of the disambiguation is translatable unambiguous constrained text 635. The translatable text 635 can be translated into a foreign language without any pre-editing required. The accuracy of the resulting translation also makes postediting unnecessary.

1. Vocabulary Checker

Figure 7:
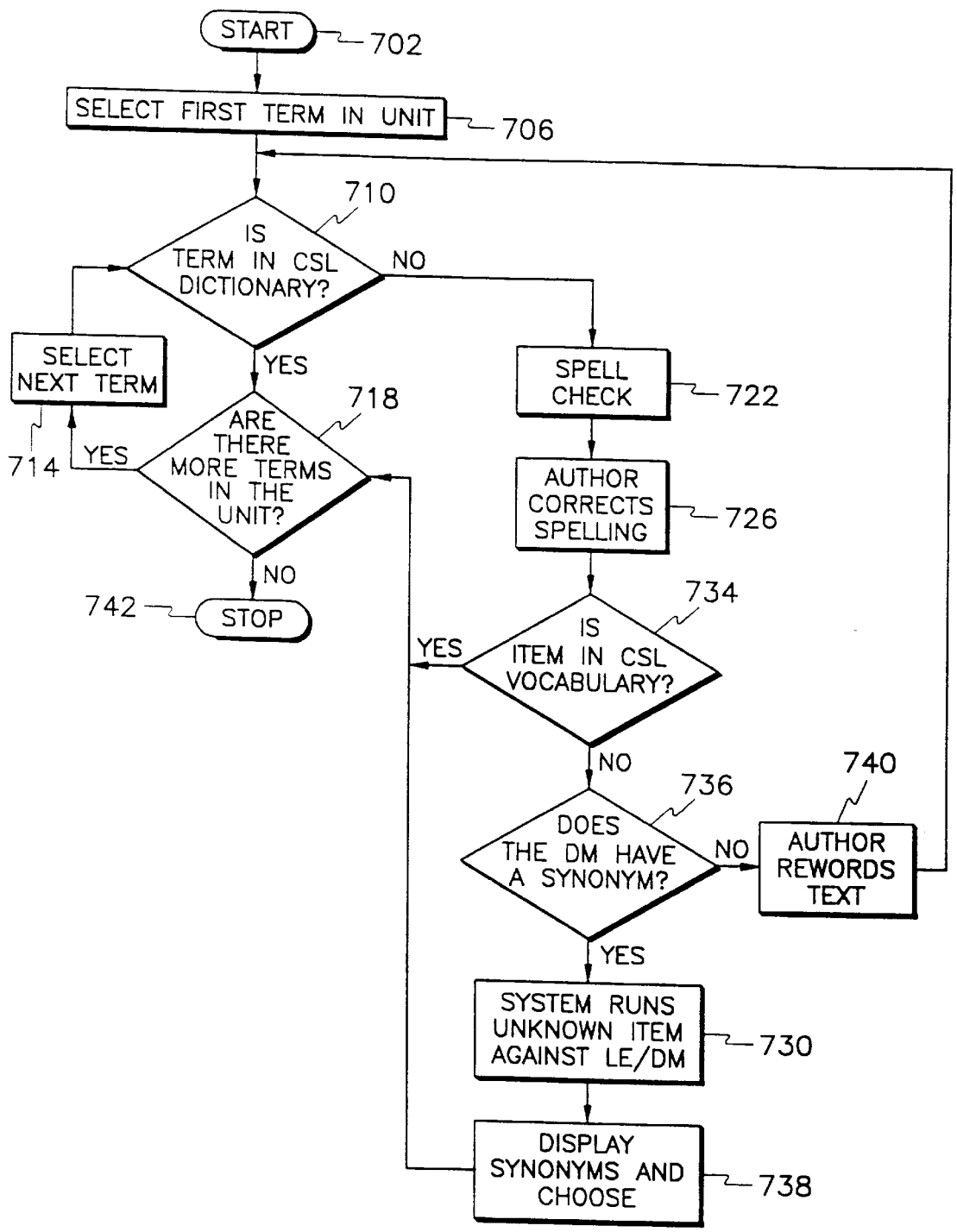
FIG. 7 is a flow diagram illustrating the operation of the vocabulary checker 610.

FIG. 7 shows a flow chart of the operation of vocabulary checker 610. The vocabulary checker 610 identifies words not known to be CSL. The vocabulary checker 610 identifies occurrences of non-CSL words, in an author's text, and helps an author find valid CSL replacements for non-CSL words. It recognizes word boundaries in a document and identifies every instance of a lexical item that is not known to be CSL.

As shown in block 706, the first term of a unit is selected to be checked. The term is then checked, as shown in block 710, against a CSL lexical database (i.e., dictionary) which contains all CSL words. If the term is not found in the CSL dictionary, the term is then spell checked against a standard dictionary, as shown in block 722. If the word has been misspelled, the author is provided a means of correcting the spelling mistake (i.e., the vocabulary checker 610 displays spelling alternatives), as shown in block 726.

The item is then checked to determine whether it is in the CSL vocabulary, as shown in block 734. If the item is in the CSL vocabulary, then the procedure advances to block 718. However, if the item is not in the CSL vocabulary, the system checks to see if the LE/DM contains a synonym for the item being checked, as shown in block 736. If at least one synonym exists in the LE/DM, the system displays the synonym(s) which are part of the CSL vocabulary and allows the author to make a selection, as shown in block 738. However, should the LE/DM not have a synonym for the item under checking, the author has the opportunity to rework her input, as shown in block 740. The outcome of this rework goes back to block 710. Once a legal selection has been made by the author, the procedure 700 then proceeds to block 718.

When a non-CSL word is identified, the author has the following options: she can select an alternative and substitute it for the word in the document, or she can enter a new item and substitute it for the word in the document. Typically, the author selects one of the synonyms to replace the non-CSL item. If the author should decide to skip the problem, the lack of resolution would result in failure of the text to be approved as CSL.

Block 718 checks to determine whether there are any more terms in the unit. If there are no more terms the procedure 700 stops. Otherwise the next term is selected, as shown in block 714, and the procedure 700 begins again from block 710.

In particular, the Vocabulary checker 610 identifies every instance of a lexical item that is not known to be CSL. For each such word, the vocabulary checker 610 will determine which of the following descriptions is applicable and report supporting information to the user interface as listed below:

a non-CSL word having known CSL synonyms; in this case the Vocabulary Checker 610 will identify the synonyms. For instance, let us assume that the word "let" is non-CSL Author's Input, When Checked: Open the valve and let more nitrogen go to the accumulator.

VC Message: The term is non-CSL, but there are related CSL alternatives.

CSL Alternatives: allow, allowed, enable, enabled, permit, permitted, leave, left CSL Sentence as Edited: Open the valve and allow more nitrogen to go to the accumulator.

a word which may only appear in CSL as part of a phrase, but which is not used in a CSL phrase in the current context; in this case the Vocabulary Checker 610 will report acceptable CSL phrases containing the word—

Author's Input, When Checked: The first time the valve lash is checked, the injector timing should be checked.

VC Message: The term is used in a non-CSL context.

CSL Alternatives: advance signal timing, advance timing groove, timing gear, timing mechanism CSL Sentence as Edited: The first time the valve lash is checked, the injector timing mechanism should be checked.

a word or phrase which must appear within double quotation marks in CSL, but which is not enclosed in quotation marks in the current context; in this case the Vocabulary Checker 610 will report that the term should be quoted—

Author's Input, When Checked: For more details, read the Testing and Adjusting article in the next section.

VC Message: This term is generally enclosed by quotes.

CSL Alternative: None CSL Sentence as Edited: For more details, read the "Testing and Adjusting" article in the next section.

a word or phrase which must appear with specific, mandatory capitalization in CSL, but which lacks that capitalization in the current context (e.g., an acronym presented in lower case); in this case the Vocabulary Checker 610 will report the correct CSL form(s)—

Author's Input, When Checked: Turn the screw until the pressure gauge reads 0 kpa (0 psi).

VC Message: The term is improperly capitalized.

CSL Alternative: kPa

CSL Sentence as Edited: Turn the screw until the pressure gauge reads 0 kPa (0 psi).

a non-word (that is, a group of letters representing a misspelled word) that has known spelling alternatives; in this case the Vocabulary Checker 610 will identify the spelling alternatives, regardless of whether the result is in CSL (the user will resubmit the chosen alternative for further checking)—

Author's Input, When Checked: When it is necesary to raise the boom, the boom must have correct support.

VC Message: The term is non-CSL.

CSL Alternative: necessary

CSL Sentence as Edited: When it is necessary to raise the boom, the boom must have correct support.

a word that is not in CSL and about which the system knows nothing. The message for an unknown word or phrase gives the author the opportunity to change the wording altogether or shield the illegal expression from checking, as the case may require. In the following example, the author uses an SGML tag to tell the system to overlook the offensive language and leave it intact—

Author's Input, When Checked: Put approximately 0.9 L (1 quart) of SAE10W hydraulic oil in the nitrogen end of the accumulator.

VC Message: The term is unknown.

CSL Alternative: None

CSL Sentence as Edited: Put approximately 0.9 L (1 quart) of <sic>SAE10W</sic>hydraulic oil in the nitrogen end of accumulator.

a punctuation mark or special symbol that is not allowed in CSL in any context

In cases where a non-CSL word has no direct CSL synonyms (that is, words that could replace it directly in a document), the system can identify related CSL words or phrases which an author could use to express the intended idea. This functionality provides authors with additional support in rewording a sentence to include only CSL vocabulary. However, changes to use these related words could not be completed with the automatic replacement facility provided for synonyms, since the changes would require some modifications to the sentence structure. For example, if "can" was in CSL and "capable" was not, an author who wrote the following sentence The system is capable of being programmed for several customer-specified parameters.

would be told that "capable" [[capable]] was not a CSL word. Although the word "can" [[can]] is CSL, neither the word "capable" nor the phrase "is capable of" [["is capable of]] can be directly replaced with "can" without the need for further changes to the sentence.

2. Grammar Checker

The purpose of the Grammar Checker is to identify places where an author's text does not conform to CSL grammatical restrictions, and to focus the author's attention on those places. The grammar checker 620 functionality will be provided by the Analysis module 127 of the MT system 120, extended to allow the system to report instances of syntactic and semantic ambiguity. The grammar checker interface allows the author to respond interactively to requests for clarification of ambiguity. It is possible that a sentence can be a constrained language but that it may have more than one interpretation. The grammar checker interface will present some indication of the two or more possible meanings of the sentence to the author and request clarification. An example of an ambiguous sentence would be: "Check the cylinders on the inside." Are the cylinders located on the inside or are you supposed to check the inside of the cylinders? There are two kinds of possible ambiguities:

Lexical ambiguities. Lexical ambiguities occur where a word can have one or more meanings in the constrained language.

While it is a desirable that in the constrained language each word should have only one meaning per part of speech, there are some words which will have more than one meaning. For example, the word "gas" can have the meaning "natural gas" or "gasoline."

At the lexical level, too, the problem may be caused by one word which can be used in two different syntactic roles in CSL. Such is the case of "fuel", which can be either a noun or a verb in CSL. When the author inputs a sentence where the syntactic role is not clear, the Grammar Checker (OC) 620 may prompt the author as follows.

Author's Input, When Checked: The sensor is attached to fuel rack.

GC Message: The term may be used as a noun or as a verb.

At this point, the author has the option of editing the sentence without help from the system (which simply requires rewriting and submitting again to the checker). If the author opts to request for help, the system may offer specific instructions to deal with problems of the same type. In this case the help is specific:

Help!

GC Message: If the word is a noun, you may want to use a determiner before it. If it is a verb, can a determiner after it help? Example: The ship sinks vs. Ship the sinks.

The author then proceeds to edit the sentence and submits it to the grammar checker 620 again.

Structural ambiguity. Structural ambiguity occurs where words in a sentence may group together in more than one way. For example: "Remove the valve with the lever." Does the phrase "with the lever" from a unit with the phrase "the valve," or does it, instead, from a unit with the verb "remove"? In other words, is this a sentence about a valve that has a lever attached to it or is it about using a lever to remove a valve?

In the IATS 105, the component designed to answer this question is the domain model 137, which is constructed in such a way as to minimize the occurrence of such ambiguities.

As shown in FIG. 5, the DM/MT 520, which supports exclusively the machine translation process, contains two types of information. On the one hand, the semantic information (A) supports the identification of relationships between concepts. On the other hand, the contextual information () specifies for a particular verb the so-called deep cases or arguments that such verb can take. In the example under consideration, let us consider first how the semantic information (A) and the contextual information (B) help the analyzer 127 determine the grammatical structure of "Remove the valve with the lever".

Among many semantic relationships, there is a relationship "is a part of" which obtains, for instance, between the concept "hat" and the concept "costume", where the "hat" "is a part of" the "costume". The same relationship obtains between the concept "sole" and the concept "shoe", "heel"and "shoe", etc. The semantic information (A) held in the DMIMT 520 identifies this and other semantic relationships between the concepts in the domain.

When the process in the MT analyzer 127 goes to the DM/MT 520 for semantic information concerning the relationship between the concept "valve" and the concept "lever". The information in the DM 137 will not enable the MT analyzer 127 to tell whether "lever" "is a part of" "valve"—the knowledge about such relationship is just not there. So the MT analyzer 127 is still at a loss as to whether the phrase "with the lever" should be attached to the word "valve".

Now when the MT analyzer 127 turns to the contextual information (B), it finds that the verb "remove" takes three cases: a nominative (NOM), an accusative (ACC), and an instrumental (INS) (at a deeper level of analysis, however, than that of the Latin grammar of our school days). That is, "remove" fits in the following case frame.

$$—_{VERB}(NOM, ACC, INS)$$

Based on this abstract pattern, we can build sentences such as the following.

| NOM | VERB | ACC | INS |
|---|---|---|---|
| The workman | removed | the sand | with a shovel |
| Peter | has removed | the box | with the nail |
| etc. | | | |

As the DM/MT contains information about the combination of the preposition "with" and nouns having the semantic feature [+INSTRUMENT], such combination form instrumental phrases. This information enables the analyzer to determine that a) since "lever" is [+INSTRUMENT], "with the lever" is INS;

b) since "remove" can take the INS case, the phrase "with the lever" attaches to, fits together with, and is interpreted as modifying "remove".

Yet the DM 137 can only be as rich as we build it. In those cases where the semantic information has not been developed as fully as possible, the lexical entries in the domain may not be able to support the disambiguation process performed by the MT analyzer 127.

Consider the case of "nail" in "Peter has removed the box with the nail". If the DM 137 contains the information about nails being part of a wooden frame but fail to contain the information that nails are l+INSTRU NT, then the MT analyzer 137 cannot possibly determine whether "with" combines with "nail" to form an instrumental phrase. The analyzer being unable to resolve the structural ambiguity, the author will be asked to resolve it. When the text submitted by the author undergoes grammar checking, the following interaction occurs.

Author's Input, When Checked: Peter has removed the box with the nail.

grammar checker 620 Message: The sentence is ambiguous.

1. Is the nail an instrument?
2. Does the "box" have a "nail"?

Once the author makes an interpretation choice, the checker attaches an invisible SGML tag to the sentence, which indicates to the system how the sentence should be translated.

As mentioned above, the MT analyzer 127 is called by the grammar checker in order to check whether input text or an IE (or part thereof) conforms to the grammatical and semantic constraints of CSL. In this regard, a preferred embodiment returns a strict "green-light, red-light" message for each sentence, the latter indicating that the author must correct the composition of the flagged sentences via the authoring environment. Once the entire input text or IE has been certified as CSL compliant it may be stored away or sent for immediate translation.

Figure 8:
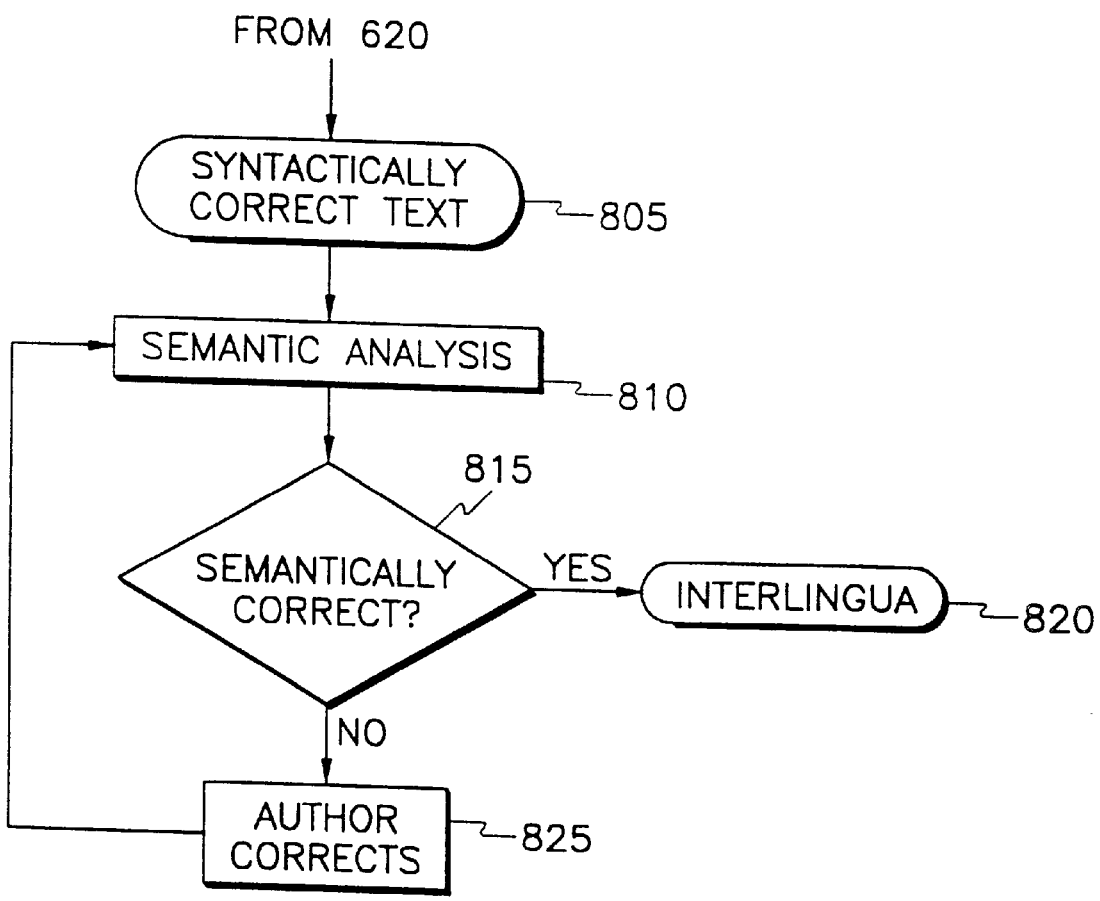
FIG. 8 is a high level flow diagram of the disambiguation block 630.

Referring to FIG. 8, a high level flow chart of the grammar checker 620 (syntactical analysis) and disambiguation checker 630 (semantic analysis) is shown. The word "sentence" is used below to refer to the unit of text that passes or fails the checking by the analysis module 127. The unit that is checked may actually be a non-sentential text component such as a heading, title, or list element, or a caption or other text from a graphic. The grammar checker 620 recognizes sentence boundaries and SGML element boundaries in an SGML marked-up text. It identifies every sentence that does not conform to the CSL specification. This will include every sentence which cannot be successfully parsed by the MT Analysis module 127. The parsing may fail for reasons including but not limited to those listed below.

The sentence includes grammatical constructions which the analysis module 127 will not parse. Such is the case, for instance, when the sentence contains a reduced relative clause. The reduction results from deleting the relative pronoun "that" and the verb "be" in a sentence like "Don't change the values that are programmed into the unit".

Author's Input, When Checked: Don't change the values programmed into the unit.

grammar checker Message: This sentence is difficult to parse.

Please check for one of the following problems:

Then the grammar checker 620 goes on to list the typical and most frequent situations where parsing is made difficult if not impossible through the use of grammatical constructions not included in the repertoire of CSL.

The punctuation usage in the sentence does not conform to CSL restrictions. As noted above, punctuation marks and special characters which are not part of CSL in any context will be flagged by the Vocabulary Checker 610. However, the Vocabulary Checker 610 does not parse input, so it will not report cases in which such an element exists in CSL but has been used in the wrong context. This kind of case will trigger a "fail" response from the Grammar Checker 620.

A CSL vocabulary word was used in a syntactic form that is not recognized for that word in CSL. The Vocabulary Checker 610 will flag some of these cases; for example, if the word test is included in CSL as a noun but not as a verb, the Vocabulary Checker will report that the past form tested is not CSL. However, the Vocabulary Checker 610 will allow the present verb form tests to pass, since that form is identical to the plural CSL noun tests. This case will trigger a "fail" response from the Grammar Checker 620.

The Grammar Checker 620 uses the MT Analysis module 127 (and the domain model 137) to identify sentences that do not conform to CSL grammatical constraints, this is known as syntactical analysis and is shown in block 805. For each such sentence, the Grammar Checker 620 reports that the sentence is not CSL. It is also possible for a sentence to be in CSL but be ambiguous. Consequently, the present invention provides semantic analysis as shown in block 710. If the sentence being checked is not semantically ambiguous, the disambiguation checker 630 will present some indication of the two or more possible meanings to the author and request clarification, as shown in blocks 815 and 825. In a preferred embodiment, when a sentence fails the Grammar Checker 620 and/or the disambiguation checker 630, the author has the following options: edit the document, in cases of an ambiguous reading, disambiguate the sentence, recheck the same input, or continue checking without editing.

Note that the present invention implements absolute adherence to constraints of vocabulary and grammar, rather than just stylistic warnings or simple error detection (such as subject-verb agreement).

If the sentence is semantically unambiguous, then it is translated into Interlingua, as shown in block 720. Once the document passes the grammar checker 620, a SGML tag designating CSL approval can be inserted in the document.

In a preferred embodiment, the Grammar Checker 620 provides pass/fail feedback to the author 160. However, more specific feedback other than pass/fail feedback can be implemented.

For a more in depth discussion of grammar checking, including disambiguation, see Tomita, M., "Sentence Disambiguation by Asking," *Computers and Translation*, 1:39–51 (1986) and Carbonell, J. and M. Tomita, "Knowledge-Based Machine Translation, the CMU Approach," in S. Nirenburg (ed.), *Machine Translation: Theoretical and Methodological Issues*, Cambridge: Cambridge University Press, pgs. 68–89 (1987) both of which are incorporated by reference.

F. Machine Translation

The MT 120 is an interlingua-type machine translation system. In such systems, the constrained source language (CSL) and the target language never come in direct contact. The processing in such systems generally occurs in two stages. First, representing the meaning of the CSL text in a language-independent formal language, called interlingua, and second, expressing this meaning using the lexical units and syntactic constructions of the target language. Interlingua MT systems, as well as other types of MT systems are well known in the art. Detailed descriptions of these different approaches to machine translation can be found in Hutchins, *Machine Translation: Past. Present. Future*, Ellis Horwood, Ltd., Chichester, UK, 1986, and Zarechnak, The *History of Machine Translation*, in Henisz-Dostert, McDonald, Zarechnak, eds., *Machine Translation*. Trends in Linguistics: Studies and Monographs, Vol. 11, The Hague, Mouton, 1979, both of which are herein incorporated by reference in their entirety.

The meaning of the CSL text 350 is represented in the specially designed knowledge representation scheme called interlingua (which is well known in the art). Interlingua is in turn represented in a frame notation and thus can be viewed as a kind of semantic network. Like other artificial or formal languages, interlingua has its own lexicon and syntax. The lexicon is based on the domain from which the translated texts are taken (e.g., computer maintenance, space exploration, etc.). Thus, interlingua "nouns" are "object concepts" in the ontology; interlingua verbs correspond, roughly, to "events" in the ontology; and interlingua adjectives and adverbs are the various properties" defined in the ontology. The ontology forms a densely connected network for the various types of concepts, called the domain model.

Figure 9:
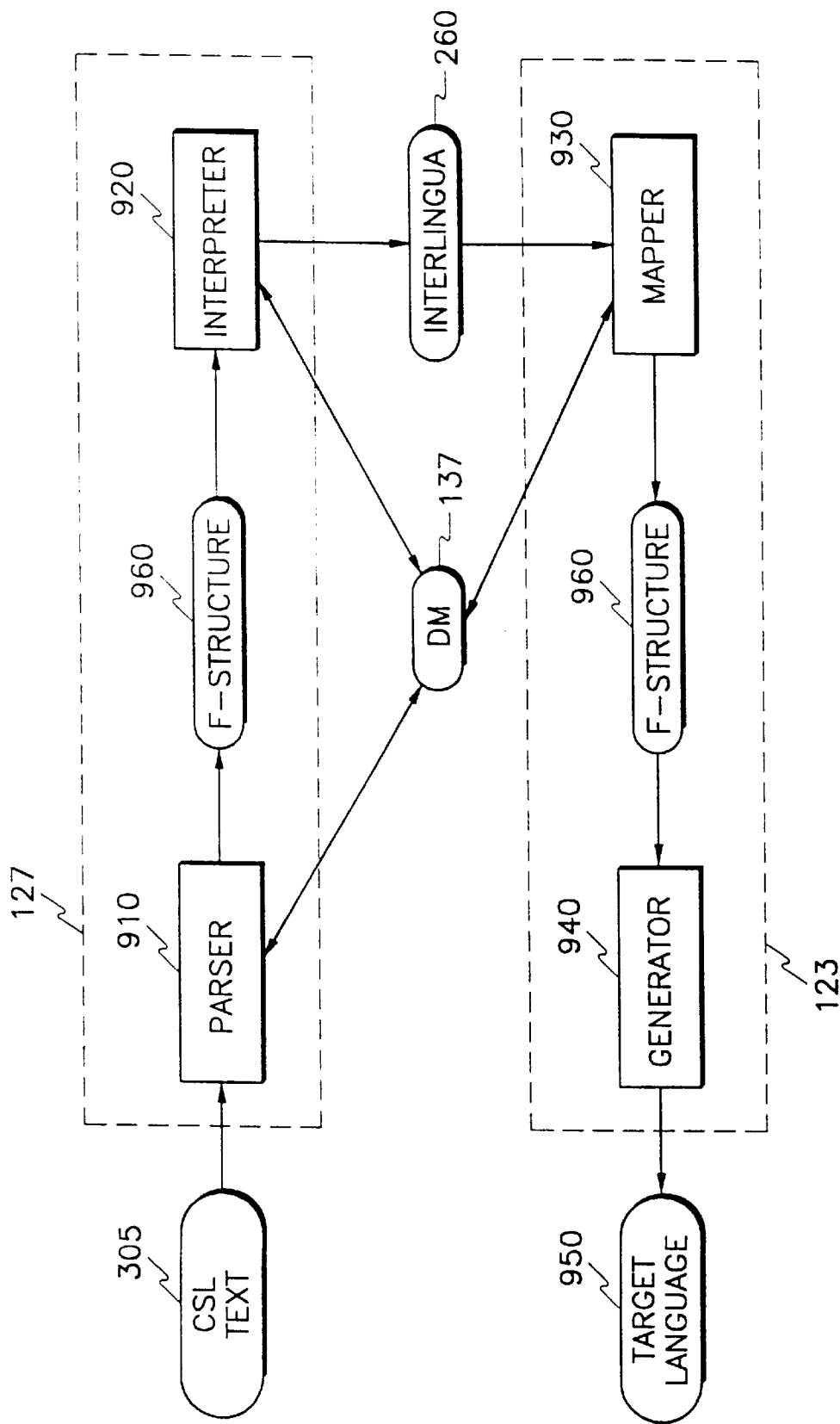
FIG. 9 is an informational flow and architectural block diagram of MT 120

Referring to FIG. 3 and FIG. 9, the Machine Translation (MT) component 120 of the IATS 105 contains two main sections. The first, the CSL analyzer 127, performs tie first processing stage of representing CSL text in interlingua. The second main section, the Target Language Generator 123, translates the interlingua representation of the "CSL-approved" texts into a target language (e.g., French, Japanese, Spanish). In performing both tasks, the MT component 120 runs as one or more independent server modules, accepting translation requests from a human translation controller (not shown). During target language generation, target language generator 123 maps the Interlingua text 260 into the appropriate units of target language syntax to produce high-quality output text 950 that requires no postediting.

Once the MT analysis module 127 has produced Interlingua text 260 for a certified CSL-compliant IE, that interlingua may be stored away, delivered, or converted immediately into a target language IE, or into an IE in each of several target languages by the generator 123 (which includes a semantics-to-syntax mapper and a Generation Kit (Tomita M. and E. Nyberg, *The Generation Kit and Transformation Version 3.2 User's Manual*, Technical Memo (1988), available from the Center for Machine Translation, Carnegie Mellon University, Pittsburgh, Pa.). MT analyzer 127 and MT generator 123 interact in two ways. First the output of the former is the input to the latter, and second they share some external knowledge sources, especially the domain model 137.

The MT system 120 is subdivided, as shown in FIG. 9. Analysis consists of a Parser 910 and an Interpreter 920. The other half of the MT 120 can be divided into a Mapper 930 and a Generator 940. The oval circles in FIG. 9 stand for the data that is produced and passed between the major software modules.

The DM 137 (and specifically the MT/DM 520) is used in three different ways during translation: (1) the parser 910 uses the DM 137 to constrain possible attachments (using strict subcategorization of arguments and modifiers during syntactic parsing); (2) the interpreter 920 uses Mhe DM 137 to instantiate the appropriate domain concepts during interpretation; (3) the mapper 930 uses the dM 137 to select the appropriate target realization for each interlingua concept.

The MT 120 runs as one or more server processes. Each such MT process accepts translation requests from the FMS 110 and returns the results. The requests contain SGML-tagged CSL text and the results contain SGML-tagged target language translations. Since translations into more than one language may be going on at once, the requests also include desired target language. Since the MT server processes are specialized by target language, a routing function is involved. This routing function is performed automatically by the FMS 110. The precise set of MT processes running at a given time and their distribution across machines is determined by the FMS 110, which will modify the mix according to the set of translation jobs outstanding at any particular time.

Referring to FIG. 9, the CSL Analyzer 127 consists of two interconnected components—a syntactic parser 910 and a semantic interpreter 920. Semantic interpreter 920 is also known in the art as a "mapping rule interpreter." The syntactic parser 910 obtains the CSL text 305 input and produces a syntactic structure for it. The syntactic parser 910 uses an LFG-type grammar. Lexical Functional Grammar (LFG) is a formalized grammar which is well known in the art of machine translation. As a result, the resultant syntactic structure is an LFG f-structure 960. As soon as the f-structure for the CSL sentence 960 is created, the semantic interpreter 920 starts applying mapping rules in order to substitute source language lexical units and syntactic constructions with their interlingua translations. Lexical units map into instances of domain concepts (e.g., the word "data" will map into the interlingua "information"), while syntactic structures map into conceptual relations (e.g., subjects of sentences often map into the "agent" relations in interlingua). See Mitamura, *The Hierarchical Organization of Predicate Frames for Interpretive Mapping in Natural Language Processing,* Center for Machine Translation, Carnegie Mellon University (May 1990) which is incorporated by reference.

The MT analyzer 127, guided by analysis knowledge (data files), translates a CSL text 305 input sentence in the source language into a semantic frame representation of the meaning of the sentence. The knowledge structures brought to bear in the analysis phase are the analysis grammars, the mapping rules, and the concept lexicon.

The first part of the analysis is the parsing process, driven by the syntactic analysis of the input sentence. The parser 910 uses the semantic restrictions embodied in the concept lexicon (domain model) to guide its teatrnent of syntactic ambiguities encountered in its analysis of the input. The mapping rules mediate between the syntactic analysis grammars and the concept lexicon.

The output of this analysis is syntactic f-structures containing all applicable semantic information. This structure can be further processed by the second part of the MT analyzer 127 to produce a semantically-organized frame representation, in the form of the instantiation of the relevant concepts from the concept lexicon that were encountered in parsing the sentence. The MT analyzer 127 arrives at this form by retrieving the f-structure's semantic features; these features contain all relevant semantic information.

The syntactic parser 910 used in the present invention is well known in the art and is described in detail in Tomita and Carbonell, The Universal Parser Architecture for Knowledge-Based Machine Translation, Technical Report, Center for Machine Tenslation, Carnegie Mellon University (May 1987) *LR Parser/Compiler Version 8.1: User's Guide,* Technical Memo, Center for Machine Translation, Carnegie Mellon University (April 1988) which are incorporated by reference.

One of the advantages of interlingua translation systems over other types of MT systems is that the interlingua 260 is language independent; that is, the subject and target languages are never in direct contact. This allows the construction of a machine translation system in which potentially any source and target languages could be selected while requiring minimal modifications to the computational structure. Clearly, then, any such system will need to be able to parse numerous source languages. Hence, a universal parser is needed which will take a language grammar as input, rather than build the grammar into the interpreter proper. This allows greater extensibility and generality.

In other words, when dealing with multiple languages the linguistic structure is no longer a universal invariant that transfers across all applications (as it was for pure English language parsers), but rather is another dimension of parameterization and extensibility. However, semantic information can remain invariant across languages (though, of course, not across domains). Therefore, it is crucial to keep semantic knowledge sources separate from syntactic ones, so that if new linguistic information is added it will apply across all semantic domains, and if new semantic information is added it will apply to all relevant languages. The universal parser attempts to accomplish this factoring without making major concessions to either run-time efficiency or semantic accuracy.

The parser 910 is characterized by three kinds of knowledge sources. One contains syntactic grammars for different languages, another contains semantic knowledge bases for different domains, and the third contains sets of rules which map syntactic forms (words and phases) into the semantic knowledge structure. Each of the syntactic grammars is completely independent of any specific domain; likewise, each of the semantic knowledge basis is independent of any specific domain; likewise, each of the semantic knowledge basis is independent of any specific language.

Further, the mapping rules are both language- and domain-dependent, and a different set of mapping rules is created for each language/domain combination. Syntactic grammars, domain knowledge bases, and mapping rules are written in a highly abstract, human-readable manner. This organization makes them easy to extend or modify, but possibly machine-inefficient for a run-time parser.

The function of the mapping rule interpreter 920 is to generate and manipulate the syntactic and semantic structures of a parse and, moreover, to generate these structures simultaneously.

The universal parser 910 produces all the possible, that is, valid, f-structures that can be derived from the sentences parsed. Each of these syntactic f-structures has semantic features, in accordance with LFG-theory these features are created at the same time as the rest of the syntactic f-structure. The semantic component may thus be regarded as an additional feature of f-structures.

Thus the semantic component is a "visible" part of the syntactic parse. The approach, of simultaneously creating the syntactic and semantic structures, has produced a system able to eliminate "meaningless" partial parses before completing them. Semantics are added to the syntactic structure when the lexicon is accessed for the definition of a word. Another part of the definition of a word is a set of structural mapping rules. These mapping rules are used when syntactic equations in grammar rules add infirmation to a syntactic structure.

The target language generator component 123 takes interlingua text 260 as its input and produces a target language text 950 as its output. The target language generator 123 consist of two major modules, one semantic and one syntactic. The semantic performs the function of target language lexical selection and choice of target language syntactic constructions; it is aided in these tasks by the generation lexicon and the generation structure mapping rules, respectively. The output of this module is an f-structure of the target language sentence that will be output by the system.

The goal of the generation module is to produce target language sentences from the interlingua text 260 frames produced by the CSL analyzer 127.

There are three main steps in generation:
1. Lexical Selection.

For each concept in the interlingua, the most appropriate lexical item must be selected.

2. F-Structure Creation.

A syntactic functional structure which determines the grammatical structure of the target utterance must be produced from the Interlingua Text frames.

3. Syntactic Generation.

The syntactic functional structure is processed by the generation grammar to produce a target language sentence.

The design of the generation module 940 combines recent research in the area of lexical selection with a map-and-generate paradigm that has been utilized in previous translation systems.

For a more in depth discussion of machine translation and the specific design and operation of the modules described above see Nirenburg et al., *Machine Translation: A Knowledge-Based Approach,* Morgan Kaufmann Publishers, Inc. (1992), Sommers & Hutchins, *Introduction to Machine Translation,* Academic Press, London (October 1991), Mitamura et al., *An Efficient Interlingua Translation System for Multi-lingual Document Production,* Proceedings of Machine Translation Summit III, Washington D.C. (Jul. 2–4, 1991), Nirenburg, S., "World Knowledge and Text Meaning", in K. Goodman and S. Nirenburg (eds.), *The KBMT Project: A Case Study in Knowledge-Based Machine Translation,* San Mateo, Calif.: Morgan Kaufmann, KBMT-89 Project Report available from the Center for Machine Translation, Carnegie Mellon University, Pittsburgh, PA (phone number (412) 268–6591) (4th Printing: March 1990), S. Nirenburg (ed.), *Machine Translation: Theoretical and Methodological Issues,* Cambridge: Cambridge University Press, pgs. 68–89 (1987), and Carbonell et al., *Steps Toward Knowledge-Based Machine Translation,* IEEE Transaction on Pattern Analysis and Machine Intelligence, Vol. PAMI-3, No. 4 (July 1981) which are all hereby incorporated by reference.

While the invention has been particularly shown and described with reference to preferred embodiments thereof, it will be understood by those skilled in the art that various changes in form and details may be made therein without departing from the spirit and scope of the invention.

What is claimed is:

1. A computer-based system for monolingual document development, comprising:

a text editor adapted to accept interactively from an author input text written in a source language;

a language editor, which is an extension of said text editor, which interactively enforces lexical constraints and grammatical constrains on a natural language subset used by said author to create said input text, wherein said author is interactively aided in enforcing said lexical constraints and said grammatical constraints on said input text so as to produce unambiguous constrained text;

a machine translation system, responsive to said language editor, that is configured to translate said unambiguous constrained text into a foreign language; and a domain model, which communicates with said language editor, wherein said domain model provides predetermined domain knowledge and linguistic semantic knowledge about lexical units and of their combinations, so as to assist said language editor in said enforcement of said lexical and grammatical constraints wherein said domain model is a tripartite domain model, said tripartite domain model comprising, a kernel which contains lexical information that is required by said language editor and said machine translation system, wherein said lexical information includes lexical items within a natural language subset along with associated semantic concepts, parts of speech, and morphological information;

a language editor domain model which contains information that is required only by said language editor, wherein said information includes at least one of a natural language subset of synonyms for items not within said natural language subset, a dictionary of definitions of said lexical items, and a set of examples of using said lexical items, and a machine translation domain model which contains information which is required by only said machine translation system, said machine translation domain model includes a hierarchy of concepts used by unambiguous mapping and semantic verification in translation.

2. A computer-based system for monolingual document development, comprising:

a text editor adapted to accept interactively from a author information elements written in a source language;

a language editor, which is an extension of said text editor, which interactively enforces lexical and grammatical constraints on a natural language subset used by said author to create unambiguous constrained information elements, wherein said author interactively aids in enforcing said lexical and grammatical constraints on said input text so as to produce said unambiguous constrained information elements;

memory means for storing said unambiguous constrained information elements for subsequent use;

a machine translation system, responsive to said language editor, that is configured to translate said unambiguous constrained information elements into a foreign language; and a domain model, which communicates with said language editor, wherein said domain model provides predetermined domain knowledge and linguistic semantic knowledge about lexical units and of their combinations, so as to assist said language editor in said enforcement of said lexical and grammatical constraints wherein said domain model is a tripartite domain model, said tripartite domain model comprising, a kernel which contains all lexical information that is required by said language editor and said machine translation system, wherein said lexical information includes all lexical items within a natural language subset along with associated semantic concepts, parts of speech, and morphological information, a language editor domain model which contains information that is required only by said language editor, wherein said information includes at least one of a natural language subset of synonyms for items not within said natural language subset, a dictionary of definitions of said lexical items, and a set of examples of using said lexical items, and a machine translation domain model which contains information which is required by only said machine translation system, said machine translation domain model includes a hierarchy of concepts used for unambiguous mapping and semantic verification in translation.

3. A computer-based method for monolingual document development, comprising the steps of:

(1) entering input text in a source language into a text editor (2) checking, via a language editor, said input text against a pre-determined set of constraints stored in a domain model that provides pre-determined domain knowledge and linguistic semantic knowledge about lexical units and of their combinations, said pre-determined set of constraints includes a set of source sublanguage rules concerning vocabulary and grammar, wherein said domain model is a tripartite domain model, said tripartite domain model comprising, a kernel which contains all lexical information that is required by said language editor and a machine translation system, wherein said lexical information includes all lexical items that satisfy said pre-determined set of constraints along with associated semantic concepts, parts of speech, and morphological information, a language editor domain model which contains information that is required only by said language editor, wherein said information includes at least one of a subset of synonyms for items that do not satisfy said pre-determined set of constraints, a dictionary definitions of said lexical items, and a set of examples of using said lexical items, and a machine translation domain model which contains information which is required by only said machine translation system, said machine translation domain model includes a hierarchy of concepts used for unambiguous mapping and semantic verification in translation;

(3) providing to an author interactive feedback relating to said input text, said interactive feedback indicating if said pre-determined set of constraints is met, said interactive feedback is performed subsequent to referring to said domain model which provides the necessary domain knowledge and linguistic semantic knowledge about lexical units and of their combinations, and grammar of a subset of a natural language; and (4) producing, after completion of step (3), unambiguous constrained text.

4. The computer-based method of claim 3, wherein said pre-determined set of constrains includes a set of source sublanguage rules concerning vocabulary and grammar, wherein said interactive feedback is performed in order to make said input text conform with said set of source sublanguage rules and to eliminate ambiguities.

5. A computer-based method for monolingual document development, comprising the steps of:

(1) entering input text in a source language into a text editor;

(2) checking, via a language editor, said input text against a constrained source language;

(3) providing to an author interactive feedback relating to said source input text if non-constrained source language is present in said source input text until said author modifies said source input text into a constrained source text, said interactive feedback is performed after consulting a domain model which provides the necessary domain knowledge and linguistic semantic knowledge about lexical units and of their combinations, wherein said domain model is a tripartite domain model, comprising, a kernel which contains all lexical information that is required by said language editor and said a machine translation system, wherein said lexical information includes lexical items within said constrained source language along with associated semantic concepts, parts of speech, and morphological information, a language editor domain model which contains information that is required only by said language editor, wherein said information includes at least one of a natural language subset of synonyms for items not within said constrained source language, a dictionary definitions of said lexical items, and a set of examples of using said lexical items, and a machine translation domain model which contains information which is required by only said machine translation system, said machine translation domain model includes a hierarchy of concepts used for unambiguous mapping and semantic verification in translation;

(4) checking for syntactic grammatical errors and semantic ambiguities in said constrained source text by consulting said domain model; and (5) providing to said author interactive feedback to remove said syntactic grammatical errors and said semantic ambiguities in said constrained source text to produce unambiguous constrained text.

6. A computer-based method for monolingual document development, comprising the steps of:

(1) entering into a text editor at least one information element created in a source language;

(2) checking, via a language editor, said at least one information element against a constrained source language;

(3) providing to an author interactive feedback relating to said at least one information element if non-constrained source language is present in said at least one information element until said at least one information element has been modified into a constrained source text, said interactive feedback is performed after referring to a domain model which provides the necessary domain knowledge and linguistic semantic knowledge about lexical units and their combinations, wherein said domain model is a tripartite domain model, said tripartite domain model comprising;

a kernel which contains all lexical information that is required by said language editor and said a machine translation system, wherein said lexical information includes lexical items within said constrained source language along with associated semantic concepts, parts of speech, and morphological information, a language editor domain model which contains information that is required only by said language editor, wherein said information includes at least one of a natural language subset synonyms for items not within said constrained source language, a dictionary of definitions of said lexical items, and a set of examples of using said lexical items, and a machine translation domain model which contains information which is required by only said machine translation system, said machine translation domain model includes a hierarchy of concepts used for unambiguous mapping and semantic verification in translation;

(4) checking for syntactic grammatical errors and semantic ambiguities in said constrained source text by consulting said domain model;

(5) providing interactive feedback to said author to remove said syntactic grammatical errors and said semantic ambiguities in said constrained source text to produce at least one unambiguous constrained information element; and (6) saving said at least one unambiguous constrained information element for later use.

7. A computer-based system for translating source language input text to a foreign language comprising:

a text editor adapted to accept interactively from an author the input text written in a source language;

a language editor, which is an extension of said text editor, which interacts with said author to produce from said input text an unambiguous constrained source text by interactively enforcing vocabulary and grammatical constraints against a constrained source language;

a machine translation system, responsive to said language editor, which is configured to translate said unambiguous constrained source text into the foreign language; and a domain model, which communicates with said language editor and said machine translation system, and which provides predetermined domain knowledge and linguistic semantic knowledge about lexical units and of their combinations, so as to aid in producing said unambiguous constrained source text and in said translation to the foreign language, wherein said domain model is a tripartite domain model, said tripartite domain model comprising, a kernel which contains lexical information that is required by said language editor and said machine translation system, wherein said lexical information includes lexical items within said constrained source language along with associated semantic concepts, parts of speech, and morphological information, a language editor domain model which contains information that is required only by said language editor, wherein said information includes at least one of a subset of synonyms for items not within said constrained source language, a dictionary definitions of said lexical items, and a set of examples of using said lexical items, and a machine translation domain model which contains information which is required by only said machine translation system, said machine translation domain model includes a hierarchy of concepts used for unambiguous mapping and semantic verification in translation.

8. The system of claim 7, further comprising means for marking with a tag a portion of said input text which has been rendered unambiguous constrained text by said interactive enforcement, wherein said tag indicates translatability.

9. The system of claim 7, wherein said machine translation system operates in a translation server environment which allows multiple authors to use the system.

10. The system of claim 7, wherein said author operates on a workstation which is part of a computer network.

11. The system of claim 7, wherein said machine translation system includes an interpreter which is configured to translate said unambiguous constrained source text into interlingua.

12. The system of claim 7, wherein said language editor provides said interaction with said author in a batch mode.

13. The system of claim 7, further comprising a graphics editor adapted to create text labels, wherein said text labels can be edited by said author with the aid of said language editor and subsequently translated by said machine translation system.

14. The system of claim 7, wherein said constrained source language is a subset of a natural language, and is specified as to lexicon and grammar.

15. The system of claim 7, wherein said language editor comprises a vocabulary checker and a grammar checker.

16. The system of claim 15, wherein said vocabulary checker checks said input text against a permitted lexicon and suggests alternatives to non-lexicon word choices.

17. The system of claim 15, wherein said grammar checker checks for compliance with predefined grammatical rules and suggests alternatives to undefined grammatical structures.

18. The system of claim 15, wherein said grammar checker provides feedback to the author concerning lexical ambiguities and structural ambiguities.

19. The system of claim 15, wherein said grammar checker provides a means for interactive disambiguation.

20. The system of claim 15, wherein said vocabulary checker includes a spell checker.

21. The system of claim 15, wherein said vocabulary checker is configured to identify words not included in said constrained source language.

22. The system of claim 15, wherein said input text is provided in blocks of information elements.

23. The system of claim 15, wherein said information elements contain tags which enable said information elements to be described in terms of their content and logical structure.

24. A computer-based system for monolingual document development and multilingual translation, comprising:

a text editor adapted for accepting interactively from an author information elements written in a source language;

a language editor, which is an extension of said text editor, which interactively enforces lexical and grammatical constraints on a natural language subset used by said author to create said input text, wherein said author is interactively aided in enforcing said lexical and grammatical constraints on said information elements to produce said unambiguous constrained information elements;

machine translation system, responsive to said language editor, which translates said unambiguous constrained information elements into a foreign language; and a domain model, which communicates with said language editor and said machine translation means, wherein said domain model provides pre-determined domain knowledge and linguistic semantic knowledge about lexical units and their combinations, so as to aid in producing said unambiguous constrained source text and in said translation to said foreign language, wherein said domain model is a tripartite domain model, said tripartite domain model comprising, a kernel which contains lexical information that is required by said language editor and said a machine translation system, wherein said lexical information includes lexical items within said natural language subset along with associated semantic concepts, parts of speech, and morphological information, a language editor domain model which contains information that is required only by said language editor, wherein said information includes at least one of a natural language subset of synonyms for items not within said natural language subset, a dictionary definitions of said lexical items, and a set of examples of using said lexical items, and a machine translation domain model which contains information which is required by only said machine translation system, said machine translation domain model includes a hierarchy of concepts used for unambiguous mapping and semantic verification in translation.

25. A computer-based system for monolingual document development and multilingual translation, comprising:

(A) a text editor adapted to accept interactively from an author input text written in a source language;

(B) a language editor, which is an extension of said text editor, which interactively enforces lexical and grammatical constraints on a natural language subset used by said author to create said input text, said language editor comprising, (i) a vocabulary checker which identifies occurrences of words that do not conform to said lexical constraints and which interactively aids said author in finding valid lexical replacements for said words that do not conform, and (ii) a grammar checker which provides interactive feedback to said author concerning syntactic and semantic ambiguity, said interactive feedback producing unambiguous constrained text; and (C) a domain model which communicates with said language editor, wherein said domain model provides pre-determined domain knowledge and linguistic semantic knowledge about lexical units and their combinations; and (D) a machine translation system, responsive to said language editor, which is configured to translate said unambiguous constrained text into a foreign language;

wherein said domain model is a tripartite domain model, said tripartite domain model comprising, a kernel which contains lexical information that is required by said language editor and said a machine translation system, wherein said lexical information includes lexical items within said natural language subset along with associated semantic concepts, parts of speech, and morphological information, a language editor domain model which contains information that is required only by said language editor, wherein said information includes at least one of a natural language subset of synonyms for items not within said natural language subset, dictionary definitions of said lexical items, and a set of examples of using said lexical items, and a machine translation domain model which contains information which is required by only said machine translation system, said machine translation domain model includes a hierarchy of concepts used for unambiguous mapping and semantic verification in translation.

26. A computer-based method for translating source language text to a foreign language, comprising the steps of:

(1) entering input text in a source language into a text editor;

(2) checking, via a language editor, said input text against a constrained source language;

(3) providing to an author interactive feedback relating to said source input text if non-constrained source language is present in said source input text until said author modifies said source input text into a constrained source text, wherein said interactive feedback includes allowing said author to select, from a list of at least one synonym, a word or phrase to replace said non-constrained source language;

(4) checking for syntactic grammatical errors and semantic ambiguities in said constrained source text;

(5) providing interactive feedback to said author to remove said syntactic grammatical errors and said semantic ambiguities in said constrained source text to produce unambiguous constrained source text; and (6) translating, via a machine translation system, said unambiguous constrained source text into a target language;

wherein steps (2) and (4) further include the step of communicating with a tripartite domain model (DM), wherein said tripartite DM provides predetermined domain knowledge and linguistic semantic knowledge about lexical units and their combinations, said tripartite domain model including, a kernel which contains lexical information that is required by said language editor and said a machine translation system, wherein said lexical information includes lexical items within said constrained source language along with associated semantic concepts, parts of speech, and morphological information, a language editor domain model which contains information that is required only by said language editor, wherein said information includes at least one of a set of synonyms for items not within said constrained source language, a dictionary of definitions of said lexical items, and a set of examples of using said lexical items, and a machine translation domain model which contains information which is required by only said machine translation system, said machine translation domain model includes a hierarchy of concepts used for unambiguous mapping and semantic verification in translation.

27. The method of claim 26, further comprising the step of marking with a tag a portion of said input text which has been rendered unambiguous constrained source text, wherein said tag indicates translatability.

28. The method of claim 26, wherein said step of translating first includes the step of translating said constrained unambiguous text into interlingua.

29. The method of claim 26, wherein said step (2) of checking comprises the steps of:

(a) checking a term from said source input text against a constrained source language (CSL) lexical knowledge base;

(b) if the term is not found in said CSL lexical knowledge base then, (i) spellchecking said term against a standard dictionary and allowing said author to correct the spelling of said term if it is misspelled;

(ii) checking said term against said CSL lexical database; and (iii) providing, if available, at least one CSL synonym from said domain model if said term is not in said CSL lexical knowledgebase, and allowing said author to choose one of said at least one synonym.

30. The method of claim 29 further comprising the step of repeating steps (a) and (b) for every term in said source input text.

31. The method of claim 29, further comprising the step of providing a list of related CSL words or phrases to said author if said term has no direct CSL synonyms.

32. The method of claim 29, further comprising the step of allowing said author to rewrite a sentence containing a non-CSL term.

33. The method of claim 26, further comprising the step of inserting a tag into said source input text after said author responds to said request for clarification of ambiguity.

34. The method of claim 26 wherein said source input text is created in blocks of information elements.

35. The method of claim 26, wherein said source input text is a text label in a graphic.

36. The method of claim 26, wherein step (3) comprises the step of presenting an indication of the two or more possible meanings of said source input text to said author.

37. A computer-based method for monolingual document development and multilingual translation, comprising the steps of:

(1) entering input text in a source language into a text editor;

(2) checking, via a language editor, said input text against a pre-determined set of constraints stored in a domain model, wherein said pre-determined set of constraints includes a set of source sublanguage rules concerning vocabulary and grammar, wherein first interactive feedback is performed in order to make said input text conform with said set of source sublanguage rules and to eliminate ambiguities, wherein said domain model is a tripartite domain model, said tripartite domain model comprising, a kernel which contains lexical information that is required by said language editor and said a machine translation system, wherein said lexical information includes lexical items that satisfy said pre-determined set of constraints along with associated semantic concepts, parts of speech, and morphological information, a language editor domain model which contains information that is required only by said language editor, wherein said information includes at least one of a set of synonyms for items that do not satisfy said pre-determined set of constraints, a dictionary of definitions of said lexical items, and a set of examples of using said lexical items, and a machine translation domain model which contains information which is required by only said machine translation system, said machine translation domain model includes a hierarchy of concepts used for unambiguous mapping and semantic verification in translation;

(3) providing to an author interactive feedback relating to said input text if said pre-determined set of criteria is not met, said interactive feedback is performed subsequent to consulting said domain model which provides the necessary domain knowledge and linguistic semantic knowledge about lexical units and their combinations, wherein said author produces, through said interactive feedback, unambiguous constrained source text; and (4) translating said unambiguous constrained source text into a target language.

38. The method of claim 37, further comprising the step of marking with a tag a portion of said input text which has been rendered unambiguous constrained text, wherein said tag indicates translatability.

39. A computer-based method for monolingual document development and multilingual translation, the computer-based method comprising the steps of:

(1) entering input text in a source language into a text editor;

(2) checking, via a language editor, said source input text against vocabulary source language constraints;

(3) providing to an author interactive feedback relating to said source input text if nonconstrained source language is present in said source input text until said source input text has been modified into a constrained source text, said interactive feedback being done subsequent to consulting a domain model which provides the necessary domain knowledge and linguistic semantic knowledge about lexical units and their combinations, wherein said domain model is a tripartite domain model, said tripartite domain model comprising, a kernel which contains lexical information that is required by said language editor and a machine translation system, wherein said lexical information includes lexical items within said constrained source language along with associated semantic concepts, parts of speech, and morphological information, a language editor domain model which contains information that is required only by said language editor, wherein said information includes at least one of a natural language subset of synonyms for items not within said constrained source language, a dictionary of definitions of said lexical items, and a set of examples of using said lexical items, and a machine translation domain model which contains information which is required by only said machine translation system, said machine translation domain model includes a hierarchy of concepts used for unambiguous mapping and semantic verification in translation;

(4) checking for syntactic grammatical errors and semantic ambiguities in said constrained source text by consulting said domain model;

(5) providing interactive feedback to said author to remove said syntactic grammatical errors and said semantic ambiguities in said constrained source text to produce an unambiguous constrained source text; and (6) saving said at least one unambiguous constrained information element for later use.

(7) translating with said machine translation system said at least one unambiguous constrained source text into a foreign language.

40. A computer-based method for monolingual document development and multilingual translation, comprising the steps of:

(1) entering into a text editor at least one information element created in a source language;

(2) checking, via a language editor, said at least one information element against a constrained source language;

(3) providing to an author interactive feedback relating to said at least one information element if non-constrained source language is present in said at least one information element until said at least one information element has been modified into a constrained source test, said interactive feedback is performed after consulting a domain model which provides domain knowledge and linguistic semantic knowledge about lexical units and of their combinations, wherein said domain model is a tripartite domain model, said tripartite domain model comprising, a kernel which contains lexical information that is required by said language editor and said a machine translation system, wherein said lexical information includes lexical items within said natural language subset along with associated semantic concepts, parts of speech, and morphological information, a language editor domain model which contains information that is required only by said language editor, wherein said information includes at least one of a natural language subset of synonyms for items not within said natural language subset, a dictionary of definitions of said lexical items and a set of examples of using said lexical items, and a machine translation domain model which contains information which is required by only said machine translation system, said machine translation domain model includes a hierarchy of concepts used for unambiguous mapping and semantic verification in translation;

(4) checking for syntactic grammatical errors and semantic ambiguities in said constrained text by consulting said domain model;

(5) providing interactive feedback to said author to remove said syntactic grammatical errors and said semantic ambiguities in said constrained source text to produce at least one unambiguous constrained information element;

(6) saving said at least one unambiguous constrained information element for later use; and (7) translating with said machine translation system said at least one unambiguous constrained information element into a foreign language.

41. The method of claim 40, further comprising the step of marking with a tag said information element certifying it to be translatable.

42. The method of claim 40 wherein step (3) of providing interactive feedback includes the step of allowing said author to select from a list of synonyms a word or phrase to replace said non-constrained language in said at least one information element.

* * * * *